United States Patent
Khalil et al.

(10) Patent No.: US 10,681,034 B2
(45) Date of Patent: Jun. 9, 2020

(54) IDENTITY MANAGEMENT VIA A CENTRALIZED IDENTITY MANAGEMENT SERVER DEVICE

(71) Applicant: Verizon Patent and Licensing Inc., Arlington, VA (US)

(72) Inventors: Manah M. Khalil, Coppell, TX (US); Michael R. Lamison, Dallas, TX (US); Saikumar Dubagunta, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 354 days.

(21) Appl. No.: 15/809,782

(22) Filed: Nov. 10, 2017

(65) Prior Publication Data
US 2019/0044940 A1    Feb. 7, 2019

Related U.S. Application Data

(60) Provisional application No. 62/539,782, filed on Aug. 1, 2017, provisional application No. 62/540,485, filed on Aug. 2, 2017.

(51) Int. Cl.
| | |
|---|---|
| *H04L 29/06* | (2006.01) |
| *H04W 12/06* | (2009.01) |
| *H04L 9/32* | (2006.01) |
| *H04W 12/00* | (2009.01) |

(52) U.S. Cl.
CPC .......... *H04L 63/0823* (2013.01); *H04L 9/321* (2013.01); *H04L 9/3247* (2013.01); *H04L 9/3263* (2013.01); *H04L 9/3271* (2013.01); *H04L 63/06* (2013.01); *H04L 63/0815* (2013.01); *H04W 12/00506* (2019.01); *H04W 12/06* (2013.01); *H04W 12/0609* (2019.01)

(58) Field of Classification Search
CPC . H04L 63/08; H04L 63/0823; H04L 63/0853; H04L 63/0861; H04L 63/0892; H04W 12/06
See application file for complete search history.

(56) References Cited

U.S. PATENT DOCUMENTS

| | | | |
|---|---|---|---|
| 8,365,293 B2* | 1/2013 | Brown | H04L 63/0823 705/51 |
| 9,621,540 B2* | 4/2017 | Almahallawy | H04L 63/062 |
| 2014/0189808 A1* | 7/2014 | Mahaffey | H04L 63/083 726/4 |
| 2017/0250972 A1* | 8/2017 | Ronda | H04L 9/08 |
| 2018/0007033 A1* | 1/2018 | Ajitomi | H04L 63/0823 |

* cited by examiner

*Primary Examiner* — Daniel B Potratz

(57) ABSTRACT

A device can establish an identity for an individual by communicating with a first set of devices. The first set of devices can include a user device, a first server device associated with a certificate authority, or a second server device associated with an identity provider. The device can authenticate the identity of the individual by communicating with a second set of devices. The second set of devices can include the user device, or a third server device associated with a first service provider. The device can authorize the identity of the individual to be used by one or more service providers by communicating with a third set of devices. The third set of devices can include the user device, the third server device, or a fourth server device associated with a second service provider.

20 Claims, 14 Drawing Sheets

IDENTITY MANAGEMENT VIA A CENTRALIZED IDENTITY MANAGEMENT SERVER DEVICE

RELATED APPLICATIONS

This application claims priority under 35 U.S.C. § 119 to U.S. Provisional Patent Application No. 62/539,782, filed on Aug. 1, 2017 and to U.S. Provisional Patent Application No. 62/540,485, filed on Aug. 2, 2017, the contents of which are incorporated by reference herein in their entirety.

BACKGROUND

Identity assurance is the ability for a party to determine, with some level of certainty, that an electronic credential, representing an entity with which the party interacts to effect an operation, can be trusted to actually belong to the entity. Knowledge-based authentication is a method of authentication which seeks to prove the identity of an entity accessing a service. For example, knowledge-based authentication can use knowledge of private information of a particular individual to prove that an individual who provides identity information (e.g., in order to access a service) is actually the particular individual.

DETAILED DESCRIPTION OF PREFERRED EMBODIMENTS

The following detailed description of example implementations refers to the accompanying drawings. The same reference numbers in different drawings can identify the same or similar elements.

An individual might use credentials associated with a first entity to verify the individual's identity with a second entity. For example, the individual can use credentials related to a social media account associated with a first service provider to access a service provided by a second service provider (e.g., by providing the second service provider with credentials that can be authenticated against a record of the first service provider). While some credentials can be used with multiple entities, the availability of such a service might depend on various entities partnering with each other, using devices that are configured to communicate with each other, and/or the like. In addition, entities that provide such a service might only be capable of providing a threshold level of assurance (LoA) related to verifying an individual's identity (e.g., a LoA associated with a username/password combination, biometric information, etc.). In some cases, the LoA that the credentials can provide might not satisfy a threshold for a particular use. In addition, the user might lack access to a centralized service that can coordinate identity authentication among various entities in a secure manner (e.g., without a need for the entities to coordinate identity authentication among each other).

Some implementations, described herein, provide an identity management server device that is capable of managing an identity for an individual (e.g., establishing an identity for the individual, authenticating the identity for the individual, and/or authorizing access to information and/or a service by the individual) among multiple entities while providing a threshold LoA related to the individual's identity. In this way, the identity management server device provides a centralized and secure way for multiple entities to authenticate an individual's identity with each other without the need to directly communicate with each other. This improves use of information related to the individual's identity with multiple entities by reducing or eliminating a need for each of the multiple entities to be in communication with each other. In addition, this conserves memory resources and computing capacity of devices associated with the multiple entities that would otherwise be used to store and process information related to authenticating an individual's identity by offloading this function to the identity management server device. Further, this improves scalability of authenticating an individual's identity by reducing or eliminating a need for devices associated with each of the multiple entities to store information related to authenticating the individual's identity.

Figure 1A:
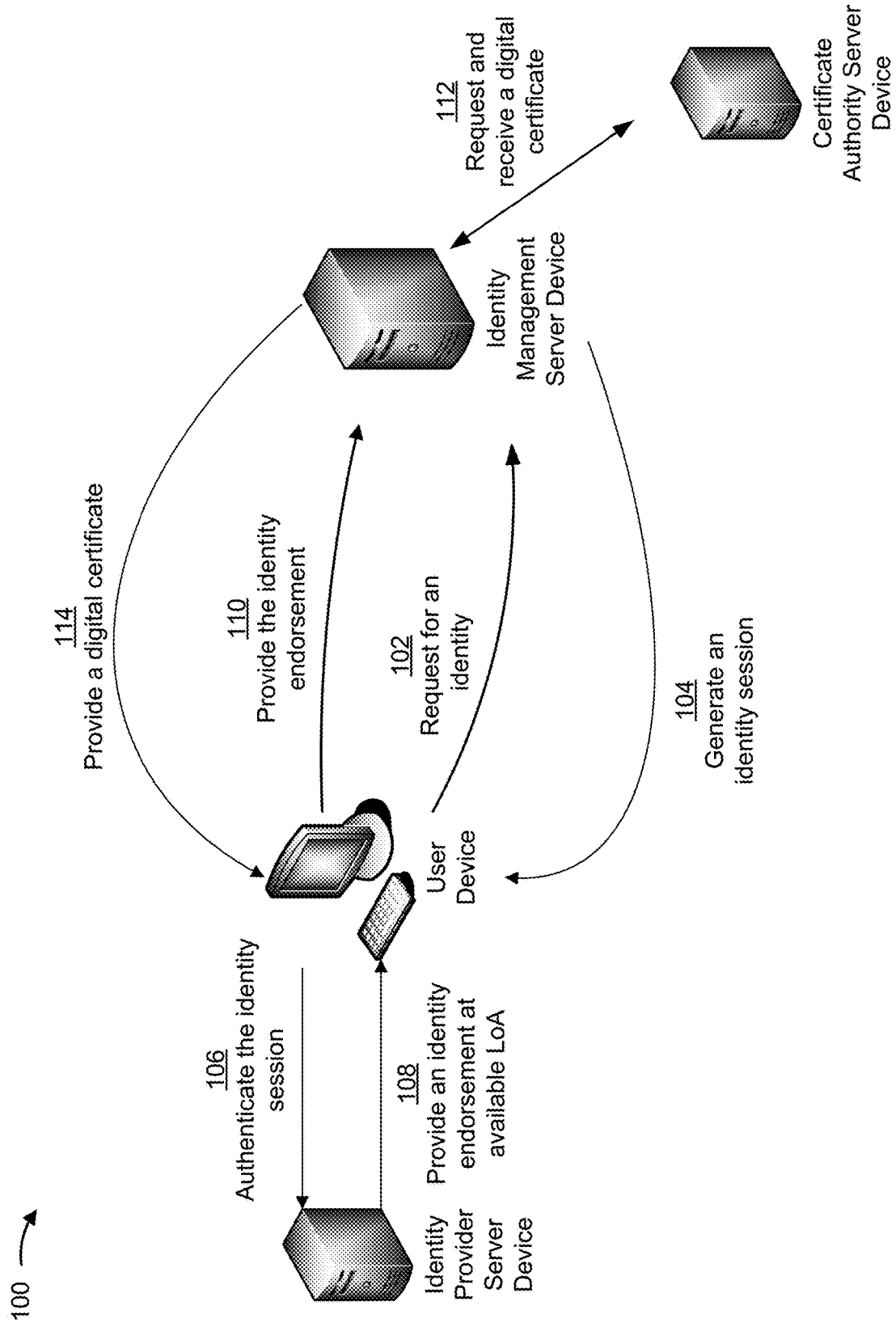
FIGS. 1A-1C are diagrams of an overview of an example implementation described herein.
Figure 1B:
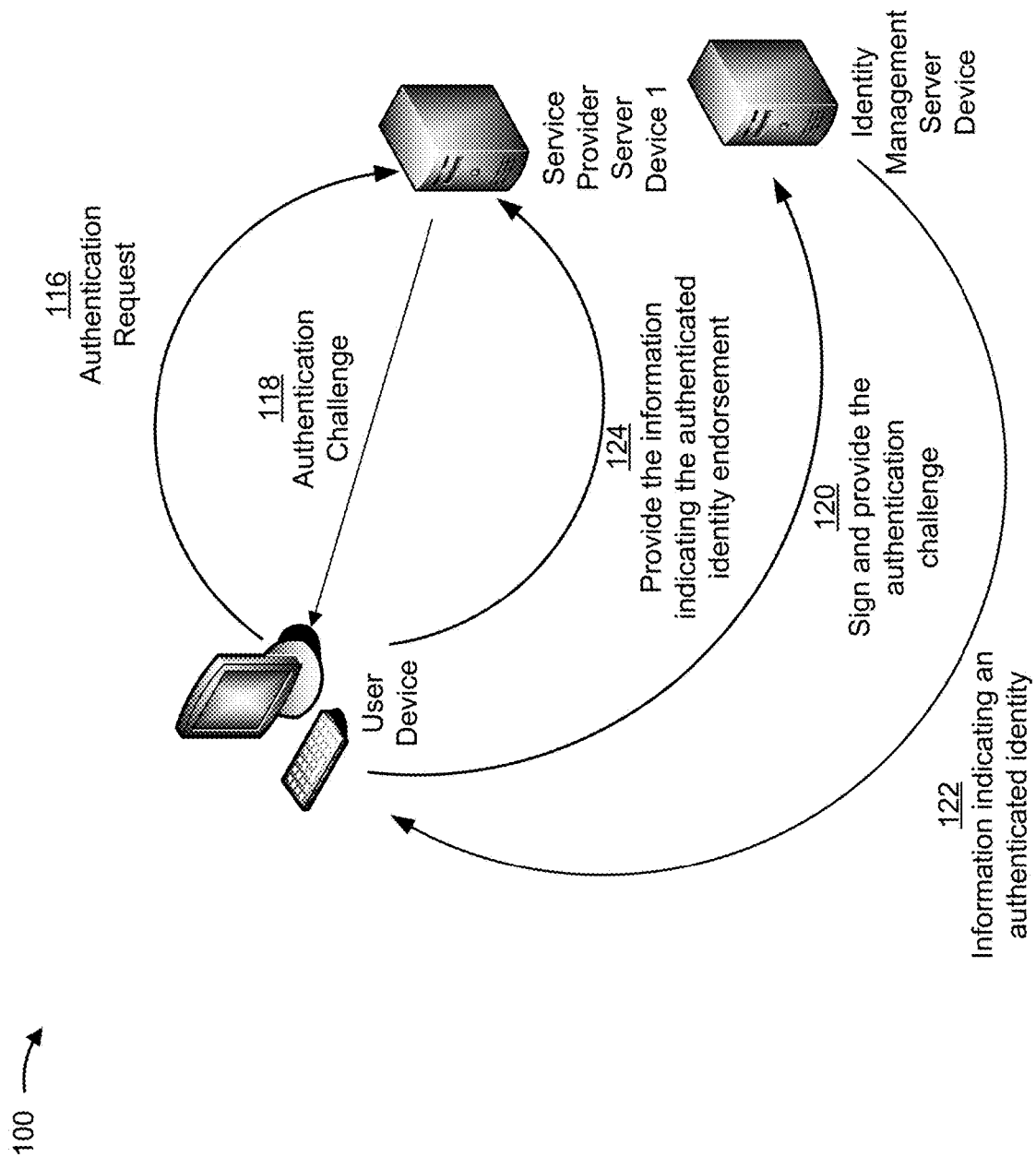
Figure 1C:
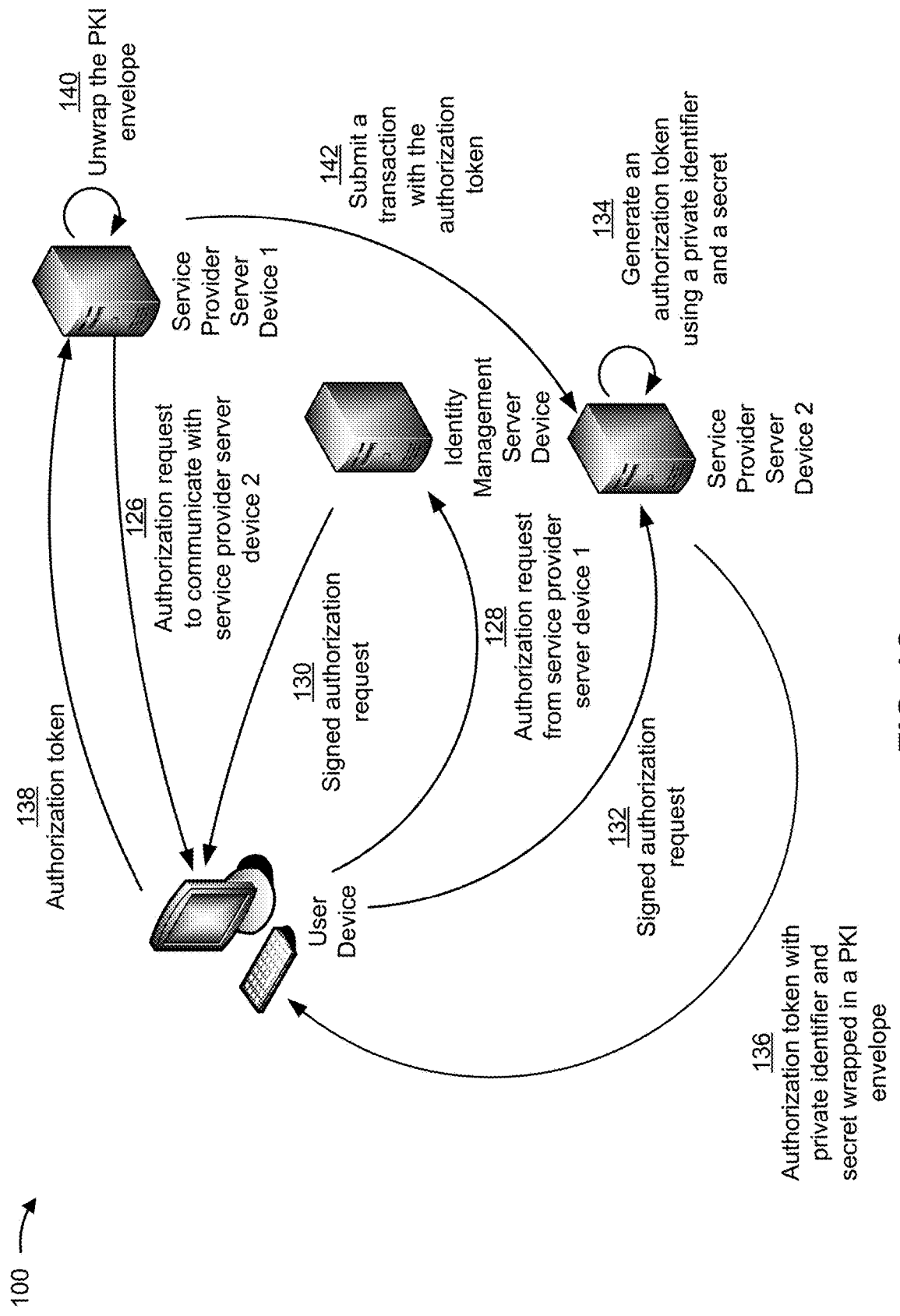

FIGS. 1A-1C are diagrams of an overview of an example implementation 100 described herein. FIGS. 1A-1C show an example of establishing an identity for a user, authenticating the identity for the user (e.g., for a service provider), and authorizing the identity to be used by a first service provider to communicate with a second service provider on behalf of the identity, respectively. Implementation 100 includes a user device, an identity management server device that functions as a central hub for multiple other devices of implementation 100, an identity provider server device associated with an identity provider, a certificate authority server device associated with a certificate authority, and one or more service provider server devices associated with corresponding service providers (not shown in FIG. 1A).

FIG. 1A shows an example of establishing an identity for a user of the user device. As shown in FIG. 1A, and by reference number 102, the user device can provide a request for establishment of an identity to the identity management server device (e.g., based on receiving input from the user of the user device to establish an identity). For example, establishment of an identity for the user can permit the user to obtain services from multiple service providers using information related to the identity of the user without the need for the user to maintain separate credentials for each of the multiple service providers. As shown by reference number 104, the identity management server device can generate an identity session and can provide, to the user device, a response to the request. For example, the identity session can include information identifying the request for the identity, a timestamp of the request, the user device from which the request was received, and/or the like. The response to the request can include a challenge to the request. For example, the challenge can request that the user verify the user's identity with an identity provider (e.g., with an identity provider server device).

As further shown in FIG. 1A, and by reference number 106, the user device can authenticate the identity session. For example, the user device can provide a set of credentials (identity proofing) to the identity provider server device to authenticate the identity session. The user device can provide a set of credentials associated with the identity service provider (e.g., a username/password combination, a security token, biometric information, etc. for an account associated with the identity service provider and accessible by the identity provider server device). The user can input the set of credentials to the user device. Additionally, or alternatively, the set of credentials can be stored by the user device.

As shown by reference number 108, the identity provider server device can provide, to the user device, an identity endorsement at an available LoA. For example, the identity provider server device can authenticate the set of credentials and can provide an identity endorsement that identifies that the set of credentials were authenticated and/or a LoA at which the set of credentials were authenticated. When providing the identity endorsement, the identity provider server device can sign the identity endorsement (e.g., using a set of credentials associated with the identity provider server device).

As further shown in FIG. 1A, and by reference number 110, the user device can provide the identity endorsement to the identity management server device. For example, the user device can provide the identity endorsement to the identity management server device to permit the identity management server device to confirm the identity of the user of the user device. Continuing with the previous example, the user device can provide the identity endorsement as a response to the challenge from the identity management server device.

As shown by reference number 112, the identity management server device can request and receive a digital certificate. For example, the identity management server device can provide, to the certificate authority server device, a request for a digital certificate, and can receive the digital certificate from the certificate authority server device. The digital certificate can permit future authentication of the user's identity with the identity management server device, can indicate that the user device is an authorized device, and/or the like. For example, the user device can provide the digital certificate to a service provider server device when the user of the user device wants to access a service from a service provider, and the service provider server device can provide the digital certificate to the identity management server device to authenticate the user's identity.

As shown by reference number 114, the identity management server device can provide the digital certificate to the user device. For example, providing the digital certificate to the user device can permit the user device to provide the digital certificate to the identity management server device in association with future communications with the identity management server device. Additionally, or alternatively, and as another example, the user device can provide the digital certificate to another device to permit the other device to authenticate the user's identity against a record stored by the identity management server device.

FIG. 1B shows an example of authenticating an identity of the user of the user device. As shown in FIG. 1B, and by reference number 116, the user device can provide an authentication request to service provider server device 1. For example, the user device can provide the authentication request in association with a user of the user device attempting to access a service provided by a first service provider via service provider server device 1. As shown by reference number 118, service provider server device 1 can provide an authentication challenge to the user device (e.g., based on receiving the authentication request from the user device). For example, service provider server device 1 can provide an authentication challenge to request, from the user device, information that can be used to authenticate an identity of the user of the user device.

As further shown in FIG. 1B, and by reference number 120, the user device can sign and provide the authentication challenge (e.g., to the identity management server device). For example, the user device can sign the authentication challenge from service provider server device 1 using the digital certificate and can provide the signed authentication challenge and the digital certificate to the identity management server device to permit the identity management server device to authenticate the identity of the user of the user device (e.g., by authenticating the digital certificate).

As shown by reference number 122, the identity management server device can provide, to the user device, information indicating an authenticated identity. For example, the identity management server device can authenticate the digital certificate using a data structure (e.g., by performing a lookup of information related to the digital certificate) and can provide information indicating an authenticated identity when the digital certificate is authenticated (e.g., when a result of the lookup indicates a match).

As shown by reference number 124, the user device can provide information indicating the authenticated identity endorsement to service provider server device 1. For example, the authenticated identity endorsement can indicate that the user's identity has been authenticated. The user device can provide the authenticated identity endorsement to service provider server device 1 to satisfy the authentication challenge from service provider server device 1.

FIG. 1C shows an example of authorizing the user's identity to be used by a device to transact with another device on behalf of the user. As shown by reference number 126, service provider server device 1 can provide, to the user device, an authorization request to communicate with service provider server device 2. For example, service provider server device 1 can provide, to the user device, an authorization request to permit a first service provider to transact with a second service provider on behalf of a user of the user device (e.g., to permit service provider server device 1 to communicate with service provider server device 2 on behalf of the user of the user device).

As shown by reference number 128, the user device can provide, to the identity management server device, the authorization request from service provider server device 1. For example, the user device can provide the digital certificate and the authorization request to the identity management server device to permit the identity management server device to authenticate the authorization request. As shown by reference number 130, the identity management server device can provide a signed authorization request to the user device. For example, the identity management server device can authenticate the digital certificate using a data structure and can generate the signed authorization request after authenticating the identity of the user of the user device based on the digital certificate. Continuing with the previous example, signing the authorization request can indicate that the identity of the user of the user device has been authenticated. The authorization request described with respect to reference number 130 can additionally include the public key of the service provider server device 1 which can later be used by service provider server device 2 to prepare and encrypt the authorization token described with respect to reference number 134.

As further shown in FIG. 1C, and by reference number 132, the user device can provide, to service provider server device 2, the signed authorization request. For example, the user device can provide the signed authorization request to service provider server device 2 to permit service provider server device 2 to identify that the identity of the user of the user device has been authenticated.

As shown by reference number 134, service provider server device 2 can generate an authorization token using a private identifier and a secret. For example, the authorization token can permit the first service provider to communicate with the second service provider (e.g., to permit service provider server device 1 to communicate with service provider server device 2 on behalf of the user of the user device and to permit service provider server device 2 to determine an identity of a user with which the communication is associated). As shown by reference number 136, service provider server device 2 can provide, to the user device, the authorization token with the private identifier and the secret wrapped in a public key infrastructure (PKI) envelope. For example, the authorization token can permit service provider server device 1 to communicate with service provider server device 2 on behalf of the user of the user device.

As further shown in FIG. 1C, and by reference number 138, the user device can provide, to service provider server device 1, the authorization token and the secret wrapped in the PKI envelope. For example, the authorization token can permit service provider server device 1 to communicate with service provider server device 2 on behalf of the user of the user device. As shown by reference number 140, service provider server device 1 can unwrap the PKI envelope of the secret. For example, service provider server device 1 can decrypt (e.g., unwrap) the PKI envelope to obtain the authorization token.

As shown by reference number 142, service provider server device 1 can submit, to service provider server device 2, a transaction with the authorization token. For example, service provider server device 1 can provide the authorization token to service provider server device 2 to permit service provider server device 2 to verify permission of service provider server device 1 to submit the transaction on behalf of the user of the user device. Service provider server device 2 can complete the transaction after authenticating the authorization token from service provider server device 1. For example, service provider server device 2 can perform a lookup to authenticate the authorization token (e.g., using a data structure that includes information identifying generated authentication tokens and corresponding service provider server devices and/or users with which the authorization tokens are associated).

In this way, the identity management server device can centrally manage an identity for an individual. This improves a capability of various entities to centrally authenticate the identity for the individual without communicating with each other. In addition, this increases an efficiency of managing an identity related to an individual by providing a centralized device that can manage the individual's identity, rather than having multiple devices associated with different entities manage the individual's identity in a distributed manner. Further, by using a centralized device to manage the individual's identity, time of the individual and/or computing resources of a user device associated with the individual are conserved by reducing or eliminating a need for the individual to use the user device to manage the individual's identity with multiple entities.

As indicated above, FIGS. 1A-1C are provided merely as an example. Other examples are possible and can differ from what was described with regard to FIGS. 1A-1C.

Figure 2:
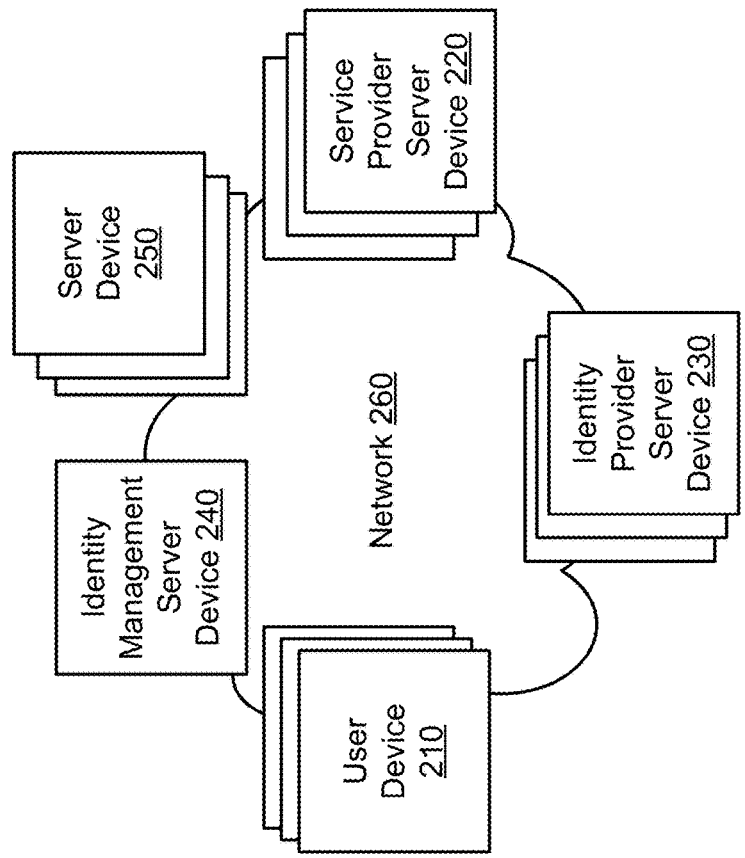
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a set of user devices 210 (referred to collectively as "user devices 210," and individually as "user device 210"), a set of service provider server devices 220 (referred to collectively as "service provider server devices 220," and individually as "service provider server device 220"), a set of identity provider server devices 230 (referred to collectively as "identity provider server devices 230," and individually as "identity provider server device 230"), an identity management server device 240, a set of server devices 250 (referred to collectively as "server devices 250," and individually as "server device 250"), and a network 260. Devices of environment 200 can interconnect via wired connections, wireless connections, or a combination of wired and wireless connections.

User device 210 includes one or more devices capable of receiving, generating, storing, processing, and/or providing information associated with a user of user device 210 (e.g., associated with an identity of the user). For example, user device 210 can include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can provide, to one or more other devices, information related to managing an identity of a user of user device 210, as described elsewhere herein. Additionally, or alternatively, user device 210 can receive, from one or more other devices, information related to managing an identity of a user of user device 210, as described elsewhere herein.

Service provider server device 220 includes one or more devices capable of receiving, providing, storing, processing, and/or generating information related to an identity of a user of user device 210. For example, service provider server device 220 can include a server (e.g., in a data center or a cloud computing environment), a data center (e.g., a multi-server micro data center), a workstation computer, a virtual machine (VM) provided in a cloud computing environment, or a similar type of device. In some implementations, service provider server device 220 can include a communication interface that allows service provider server device 220 to receive information from and/or transmit information to other devices in environment 200. In some implementations, service provider server device 220 can be associated with a service provider (e.g., an entity that provides a service to user device 210 and/or a user of user device 210). In some implementations, service provider server device 220 can receive, from another device, information related to authenticating and/or authorizing an identity of a user of user device 210, as described elsewhere herein. Additionally, or alternatively, service provider server device 220 can provide, to another device, information related to authenticating and/or authorizing an identity of a user of user device 210, as described elsewhere herein.

Identity provider server device 230 includes one or more devices capable of receiving, providing, storing, processing, and/or generating information related to managing an identity of a user of user device 210. For example, identity provider server device 230 can include a server (e.g., in a data center or a cloud computing environment), a data center (e.g., a multi-server micro data center), a workstation computer, a virtual machine (VM) provided in a cloud computing environment, or a similar type of device. In some implementations, identity provider server device 230 can be associated with an identity provider (e.g., an entity that has previously authenticated an identity of a user of user device

210 at a threshold LoA), as described elsewhere herein. In some implementations, identity provider server device 230 can include a communication interface that allows identity provider server device 230 to receive information from and/or transmit information to other devices in environment 200.

In some implementations, identity provider server device 230 can be associated with an identity provider (e.g., an entity that has previously verified an identity of an individual according to a threshold LoA, such as a telecommunications organization, a financial institution, a utility, an employer, etc.). In some implementations, identity provider server device 230 can receive, from user device 210, information related to authenticating an identity of a user of user device 210, as described elsewhere herein. Additionally, or alternatively, identity provider server device 230 can provide, to user device 210, information indicating that an identity of a user of user device 210 has been authenticated, as described elsewhere herein.

Identity management server device 240 includes one or more devices capable of receiving, providing, storing, processing, and/or generating information related to managing an identity of a user of user device 210. For example, identity management server device 240 can include a server (e.g., in a data center or a cloud computing environment), a data center (e.g., a multi-server micro data center), a workstation computer, a virtual machine (VM) provided in a cloud computing environment, or a similar type of device. In some implementations, identity management server device 240 can include a communication interface that allows identity management server device 240 to receive information from and/or transmit information to other devices in environment 200. In some implementations, identity management server device 240 can receive, from one or more other devices, information related to managing an identity of a user of user device 210, as described elsewhere herein. Additionally, or alternatively, identity management server device 240 can perform an action and/or provide information related to managing an identity of a user of user device 210, as described elsewhere herein.

Server device 250 includes one or more devices capable of receiving, providing, storing, processing, and/or generating information related to managing an identity of user device 210. For example, server device 250 can include a server (e.g., in a data center or a cloud computing environment), a data center (e.g., a multi-server micro data center), a workstation computer, a virtual machine (VM) provided in a cloud computing environment, or a similar type of device. In some implementations, server device 250 can include a communication interface that allows server device 250 to receive information from and/or transmit information to other devices in environment 200. In some implementations, server device 250 can function as a proxy server for a service provider or an identity provider, as described elsewhere herein. Additionally, or alternatively, server device 250 can be associated with an entity other than a service provider and/or an identity provider, such as a certificate authority, as described elsewhere herein.

Network 260 includes one or more wired and/or wireless networks. For example, network 260 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
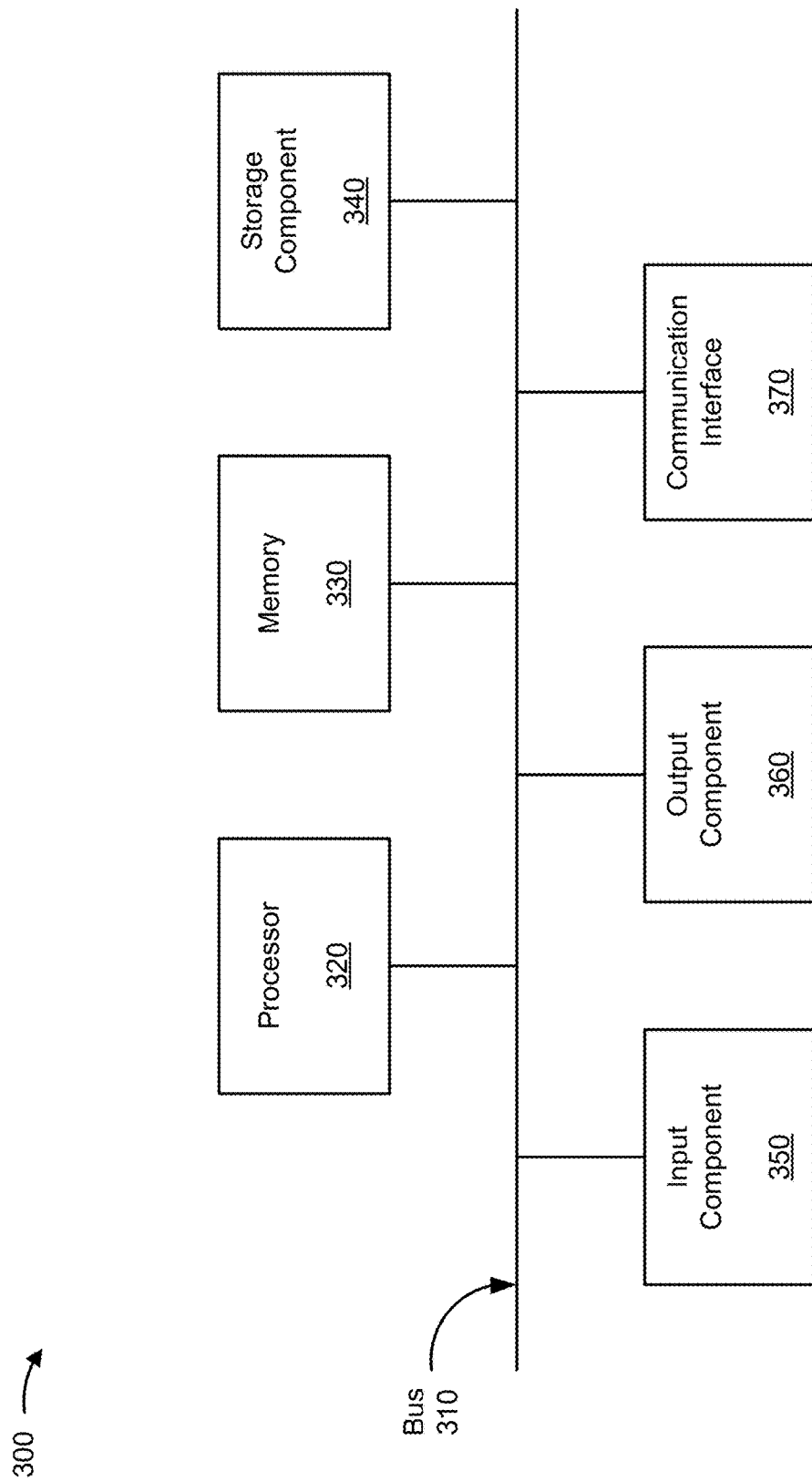
FIG. 3 is a diagram of example components of one or more devices of FIG. 2.

FIG. 3 is a diagram of example components of a device 300. Device 300 can correspond to user device 210, service provider server device 220, identity provider server device 230, identity management server device 240, and/or server device 250. In some implementations, user device 210, service provider server device 220, identity provider server device 230, identity management server device 240, and/or server device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
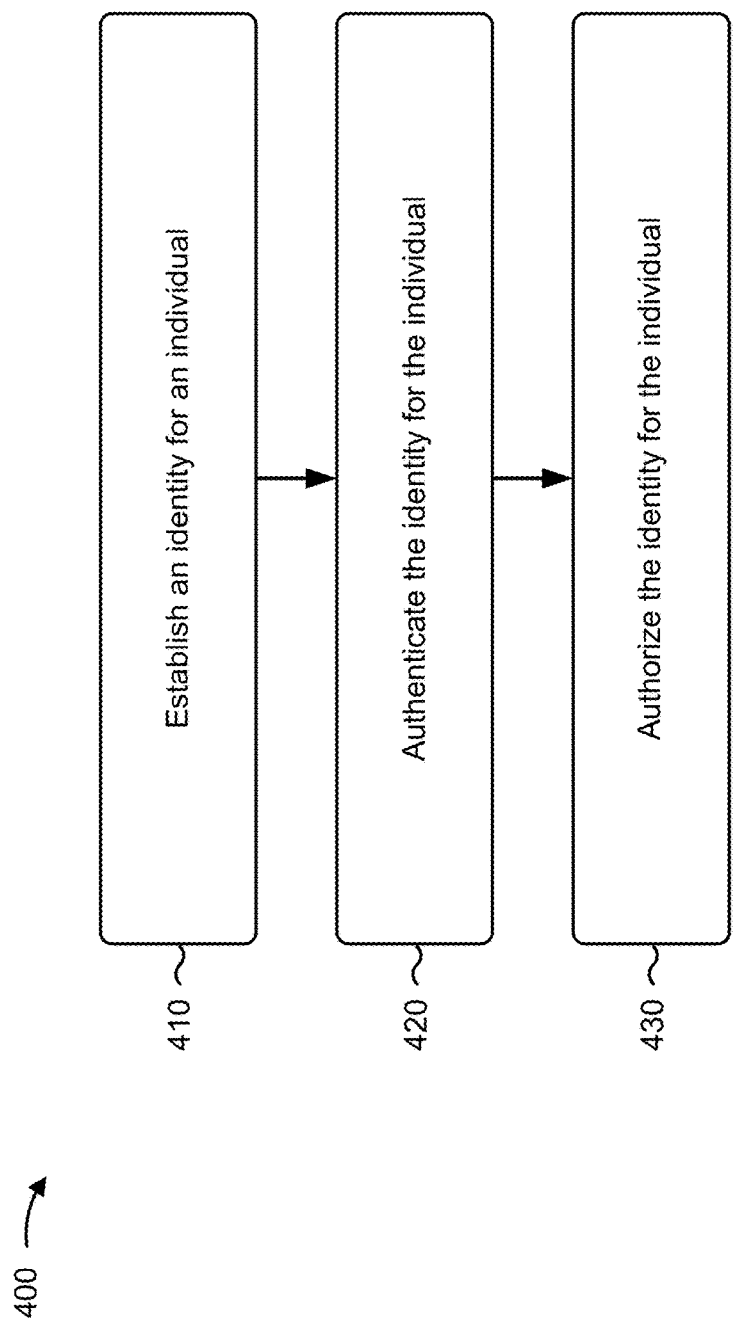
FIG. 4 is a flow chart of an example process for identity management via a centralized identity management server device.

FIG. 4 is a flow chart of an example process 400 for identity management via a centralized identity management server device. In some implementations, one or more process blocks of FIG. 4 can be performed by identity management server device 240. In some implementations, one or more process blocks of FIG. 4 can be performed by another device or a group of devices separate from or including identity management server device 240, such as user device 210, service provider server device 220, identity provider server device 230, and server device 250.

As shown in FIG. 4, process 400 can include establishing an identity for an individual (block 410). For example, identity management server device 240 can establish an identity for an individual. Establishing an identity is further shown in, and described with respect to, other figures, such as FIG. 5.

In some implementations, identity management server device 240 can establish an identity by communicating with one or more of a first set of devices. For example, the first set of devices can include user device 210 (e.g., associated with an individual for which an identity is to be established), a certificate authority server device 250 associated with a certificate authority (e.g., an entity that generates digital certificates for use by devices associated with other entities), and/or identity provider server device 230.

In some implementations, identity management server device 240 can establish an identity based on receiving a request to establish the identity. For example, identity management server device 240 can receive the request from user device 210. In some implementations, identity management server device 240 can generate an identity session related to establishing an identity for an individual after receiving a request to establish an identity for the individual and can provide the identity session to user device 210. For example, the identity session can include information that identifies the request, a timestamp of the request, a threshold LoA that needs to be satisfied to establish an identity, and/or the like.

In some implementations, user device 210 can provide, to identity provider server device 230, an identity session after receiving the identity session from identity management server device 240 (e.g., to permit identity provider server device 230 to authenticate the identity session). In some implementations, identity provider server device 230 can request, from user device 210, a set of credentials (e.g., a username/password combination, biometric information, a security token, etc.) to authenticate the identity session against a record of identity provider server device 230. For example, identity provider server device 230 can request that a user of user device 210 input a set of credentials, that user device 210 provide a stored set of credentials, and/or the like.

In some implementations, a set of credentials can need to satisfy a threshold LoA. For example, a LoA can indicate a level of security and/or reliability associated with a set of credentials and/or a degree to which a set of credentials can be used to verify that an individual presenting the set of credentials is an owner of the set of credentials. Continuing with the previous example, a first LoA, and lowest LoA, can be associated with a set of credentials for a network authentication (e.g., network password). Additionally, or alternatively, and as another example, a set of credentials associated with a second LoA, higher than the first LoA, can include a username/password combination, email verification, biometric information (e.g., a finger print scan, a retina scan, a voice scan, etc.), and/or the like. Additionally, or alternatively, and as another example, a set of credentials associated with a third LoA, higher than the second LoA, can include a set of credentials associated with the first and/or second LoA plus a set of credentials for a third party.

In some implementations, identity provider server device 230 can authenticate a set of credentials from user device 210. For example, identity provider server device 230 can perform a lookup using a data structure and can authenticate a set of credentials where a result of the lookup indicates a match. In some implementations, identity provider server device 230 can provide, to user device 210, an identity endorsement after authenticating a set of credentials. For example, identity provider server device 230 can provide an identity endorsement at an available LoA (e.g., the identity endorsement identifying a LoA at which the set of credentials were authenticated). In some implementations, identity provider server device 230 can sign the identity endorsement to form a signed identity endorsement (e.g., using a digital certificate associated with identity provider server device 230).

In some implementations, identity management server device 240 can receive, from user device 210, a signed and authenticated identity endorsement. For example, a signed and authenticated identity endorsement can identify that an individual has provided a set of credentials to identity provider server device 230 to authenticate an identity of the individual to identity provider server device 230. In some implementations, identity management server device 240 can provide a digital certificate to user device 210 after receiving a signed and authenticated identity endorsement. For example, a digital certificate can be used by user device 210 to permit identity management server device 240 to authenticate an identity of an individual when user device 210 communicates with identity management server device 240. Additionally, or alternatively, and as another example, user device 210 can provide a digital certificate to a device to permit the device to communicate with another device on behalf of a user of user device 210.

In some implementations, identity management server device 240 can provide a digital certificate after receiving the digital certificate from a certificate authority server device 250. For example, the certificate authority server device 250 can generate a digital certificate based on information related to a request to establish an identity, a user of user device 210, user device 210, an identity endorsement, and/or the like. In some implementations, identity management server device 240 can store information identifying a digital certificate and a corresponding user device 210 and/or individual with which the digital certificate is associated, to permit future authentication and/or authorization of an identity.

In this way, identity management server device 240 can establish an identity for an individual.

As further shown in FIG. 4, process 400 can include authenticating the identity for the individual (block 420). For example, identity management server device 240 can authenticate the identity for the individual.

In some implementations, identity management server device 240 can authenticate an identity by communicating with one or more of a second set of devices. For example, the second set of devices can include user device 210 and/or service provider server device 220.

In some implementations, identity management server device 240 can receive a signed authentication challenge from user device 210. For example, identity management server device 240 can receive a signed authentication challenge from user device 210 to cause identity management server device 240 to authenticate an identity of user of user device 210. In some implementations, user device 210 can provide an authentication request to service provider server device 220 (e.g., to access a service provided by service provider server device 220) prior to providing a signed authentication challenge to identity management server device 240.

In some implementations, based on an authentication request from user device 210, service provider server device 220 can provide, to user device 210, an authentication challenge to request authentication of an identity of a user of user device 210 prior to permitting user device 210 to access a service provided by service provider server device 220. In some implementations, user device 210 can sign an authentication challenge from service provider server device 220 using a digital certificate stored by user device 210 (e.g., a digital certificate provided by identity management server device 240) to form a signed authentication challenge.

In some implementations, identity management server device 240 can authenticate an identity of a user of user device 210 after receiving a signed authentication challenge from user device 210. For example, identity management server device 240 can perform a lookup of information identifying a digital certificate in a data structure and can authenticate the digital certificate where a result of the lookup indicates a match. In some implementations, identity management server device 240 can provide, to user device 210, information indicating an authenticated identity (e.g., after authenticating a digital certificate from user device 210). For example, information indicating an authenticated identity can permit satisfaction of an authentication challenge from service provider server device 220. In some implementations, user device 210 can provide, to service provider server device 220, information indicating an authenticated identity endorsement (e.g., to satisfy an authentication challenge from service provider server device 220 and to access a service provided by service provider server device 220).

In this way, identity management server device 240 can authenticate the identity for the individual.

As further shown in FIG. 4, process 400 can include authorizing the identity for the individual (block 430). For example, identity management server device 240 can authorize the identity for the individual. In some implementations, authorizing an identity can include authorizing an entity to use an identity to communicate with another entity, to communicate on behalf of an individual with which the identity is associated, to permit access to information related to an identity, and/or the like.

In some implementations, identity management server device 240 can communicate with one or more of a third set of devices to authenticate an identity. For example, the third set of devices can include user device 210, a first service provider server device 220 associated with a first service provider, and/or a second service provider server device 220 associated with a second service provider.

In some implementations, identity management server device 240 can receive, from user device 210, an authorization request to authorize an identity of a user of user device 210. For example, an authorization request can be related to authorizing a first service provider server device 220 to communicate with a second service provider server device 220 on behalf of the user of user device 210. In some implementations, user device 210 can provide a digital certificate and/or a set of credentials to identity management server device 240 to permit identity management server device 240 to authenticate an identity of a user of user device 210.

In some implementations, identity management server device 240 can authenticate an identity of a user of user device 210 based on receiving an authentication request from user device 210 (e.g., to approve an authorization request). For example, identity management server device 240 can perform a lookup of information related to a digital certificate, information related to user device 210, information related to a user of user device 210, a set of credentials provided by user device 210, and/or the like (e.g., using a data structure) to authenticate an identity of a user of user device 210.

In some implementations, identity management server device 240 can sign an authentication request to form a signed authentication request (e.g., using a digital certificate associated with identity management server device 240), and can provide the signed authentication request to user device 210. For example, providing a signed authentication request to user device 210 can permit user device 210 to provide information to another device that indicates that an identity of a user of user device 210 has been authenticated and that the user can provide the device with authorization to, for example, communicate on behalf of the user.

In some implementations, user device 210 can provide a signed authorization request to another device, such as the second service provider server device 220. For example, user device 210 can provide a signed authorization request to the service provider server device 220 to confirm, to the second service provider server device 220, that an identity of a user of user device 210 has been authenticated. In some implementations, the second service provider server device 220 can generate an authorization token based on receiving a signed authorization request from user device 210. For example, an authorization token can identify a signed authorization request, a user of user device 210, and/or the like with which the authorization token is associated. In some implementations, a device can provide an authorization token generated by the second service provider server device 220 to the second service provider server device 220 to indicate that the device is authorized to communicate on behalf of a user of user device 210, to identify an identity with which a communication from the device is associated, and/or the like. In some implementations, the second service provider server device 220 can provide, to user device 210, an authorization token that the second service provider server device 220 generated.

In some implementations, user device 210 can provide an authorization token received from the second service provider server device 220 to the first service provider server device 220. For example, providing an authorization token to the first service provider server device 220 can permit service provider server device 220 to communicate with the second service provider server device 220 on behalf of a user of user device 210, such as by permitting the first service provider server device 220 to prove, to the second service provider server device 220 that the first service provider server device 220 has been authorized by an owner of an identity.

In some implementations, the first service provider server device 220 can communicate with the second service provider server device 220 after receiving an authorization token from user device 210 and can provide the authorization token in association with communicating with the second service provider server device 220. For example, the first service provider server device 220 can submit a transaction to the second service provider server device 220 on behalf of a user of user device 210, and can provide an authorization token in association with submitting the transaction.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
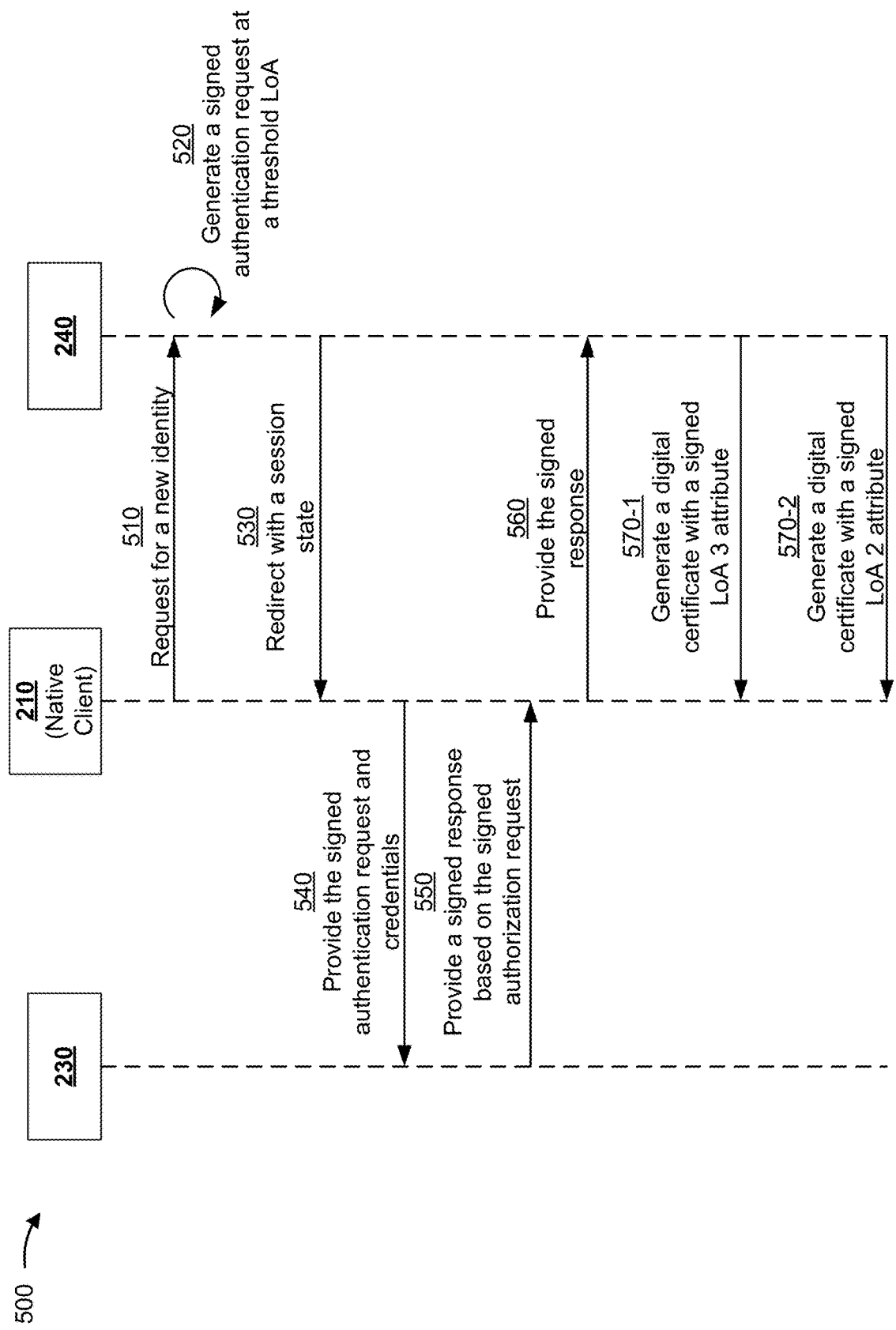
FIGS. 5-12 are diagrams of example implementations relating to the example process shown in FIG. 4.

FIGS. 5-12 are diagrams of example implementations 500-1200 related to example process 400 shown in FIG. 4. FIG. 5 shows an example of using a native client on user device 210 to establish an identity.

In some implementations, and as shown by reference number 510, a native client on user device 210 can provide a request for a new identity to identity management server device 240. For example, user device 210 can provide, via the native client and to identity management server device 240, a request to establish an identity. In some implementations, and as shown by reference number 520, identity management server device 240 can generate a signed authentication request at a threshold LoA. For example, the signed authentication request might be provided to identity provider server device 230

In some implementations, and as shown by reference number 530, identity management server device 240 can provide, to user device 210, a redirect with a session state. For example, the redirect can cause user device 210 to provide the signed authentication request to identity provider server device 230 and the session state can include information related to the request (e.g., a session identifier, user input and/or selections via the native client, a timestamp of the request, etc.).

In some implementations, and as shown by reference number 540, the native client on user device 210 can provide the signed authentication request and credentials to identity provider server device 230. For example, the user of user device 210 can cause, via the native client, user device 210 to provide the signed authentication request and credentials (e.g., a username/password combination, a security token, etc.) to identity provider server device 230. In some implementations, and as shown by reference number 550, identity provider server device 230 can provide a signed response to user device 210 based on the signed authorization request (e.g., to confirm authentication of the credentials from user device 210). For example, identity provider server device 230 can provide a token, a network identifier for user device 210 and/or a user of user device 210, signed LoA information (e.g., identifying a LoA at which the credentials were authenticated), and/or the like to user device 210.

In some implementations, and as shown by reference number 560, the native client on user device 210 can provide the signed response from identity provider server device 230 to identity management server device 240. For example, the native client can provide the signed response to identity management server device 240 to permit identity management server device 240 to authenticate an identity of the user of user device 210 in association with establishing an identity for the user of user device 210.

In some implementations, and as shown by reference number 570-1, identity management server device 240 can generate a digital certificate with a signed LoA 3 attribute (e.g., a signature indicating that the credentials were authenticated at a third LoA) depending on the credentials provided to identity provider server device 230. For example, the digital certificate can be signed by identity provider server device 230 and/or identity management server device 240. Conversely, in some implementations, and as shown by reference number 570-2, identity management server device 240 can generate a digital certificate with a signed LoA 2 attribute (e.g., a signature indicating that the credentials were authenticated at a second LoA) depending on the credentials provided to identity provider server device 230. For example, the digital certificate can be signed by identity provider server device 230 and/or identity management server device 240.

Figure 6:
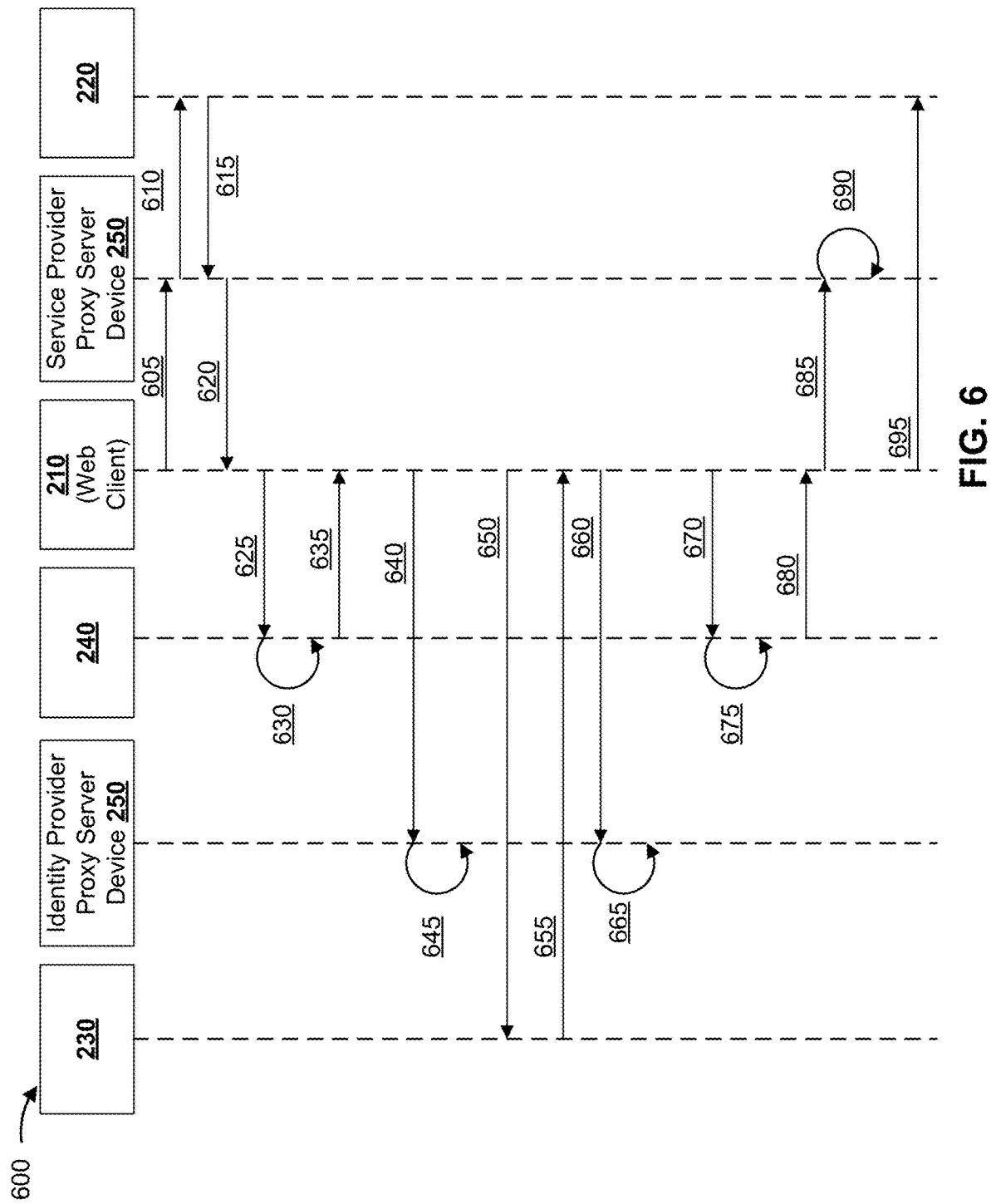

FIG. 6 shows an example of using a web client to authenticate an identity of a user of user device 210.

In some implementations, and as shown by reference number 605, a web client on user device 210 can provide an authentication request to a service provider proxy server device 250. For example, the authentication request can be associated with authenticating an identity of a user of user device 210 in association with the user of user device 210 accessing a service provided by service provider server device 220. In some implementations, and as shown by reference number 610, service provider proxy server device 250 can provide the authentication request to service provider server device 220. In some implementations, service provider proxy server device 250 can encrypt and/or decrypt information stored on service provider server device 220 that is destined for another device. In this way, service provider proxy server device 250 can reduce or eliminate a need for identity management server device 240 and/or another device to have access to encryption procedures of service provider server device 220, thereby increasing a security of service provider server device 220.

In some implementations, and as shown by reference number 615, service provider server device 220 can provide a redirect with a private client identifier and/or secret to service provider proxy server device 250. For example, the redirect can be associated with causing user device 210 to authenticate against a record of identity management server device 240. As shown by reference number 620, service provider proxy server device 250 can provide, to user device 210, the redirect signed with a private key of a service provider associated with service provider proxy server device 250 and/or metadata related to the service provider. Additionally, or alternatively, the redirect can be translated to correspond to a universal identifier for the service provider and/or can include a secret associated with the service provider.

In some implementations, and as shown by reference number 625, the web client on user device 210 can provide, to identity management server device 240, the signed redirect. In some implementations, and as shown by reference number 630, identity management server device 240 can prompt, via the web client, the user to grant permission for the requested authentication. In some implementations, and as shown by reference number 635, identity management server device 240 can provide, to user device 210, the redirect signed with a private key of identity management server device 240 and metadata related to identity management server device 240. In some implementations, and as shown by reference number 640, the web client on user device 210 can provide, to identity provider proxy server device 250, the redirect signed with the private key of identity management server device 240 and the metadata. In some implementations, and as shown by reference number 645, identity provider proxy server device 250 can unwrap the redirect and redirect the web client to identity provider server device 230.

In some implementations, and as shown by reference number 650, the web client on user device 210 can provide, to identity provider server device 230, the redirect with an identity provider server device 230 issued identifier for a user of user device 210 and a session state. In some implementations, and as shown by reference number 655, identity provider server device 230 can provide, to user device 210, a response with a redirect to identity provider proxy server device 250 with an access token related to accessing identity provider proxy server device 250, an identifier token related to a user of user device 210, and a session state. In some implementations, and as shown by reference number 660, the web client on user device 210 can provide, to identity provider proxy server device 250, the response from identity provider server device 230. In some implementations, and as shown by reference number 665, identity provider proxy server device 250 can perform a translation of information identifying an identity of a user associated with identity provider server device 230 to an identity associated with identity management server device 240 and can redirect to identity management server device 240. In some implementations, identity provider proxy server device 250 can store the access token.

In some implementations, and as shown by reference number 670, the web client on user device 210 can provide, to identity management server device 240, a wrapped response containing an identifier, which identifies the user, stored by identity provider server device 230 and the access token. In some implementations, and as shown by reference number 675, identity management server device 240 can generate a session token with an expiration token and can insert a cookie into the wrapped response with an access token and an identifier associated with identity provider server device 230 and that identifies the user.

In some implementations, and as shown by reference number 680, identity management server device 240 can provide, to user device 210, a wrapped response with a translated identifier, which identifies the user, for the service provider (e.g., translated to an identifier used by service provider server device 220). In some implementations, and as shown by reference number 685, the web client on user device 210 can provide, to service provider proxy server device 250, the wrapped response. In some implementations, and as shown by reference number 690, service provider proxy server device 250 can unwrap the response, validate the metadata and signature, and/or can decrypt the access token using a universal secret. In some implementations, service provider server device 220 can encrypt the response using an internal secret, and can redirect the web client to service provider server device 220. In some implementations, and as shown by reference number 695, the web client on user device 210 can provide a communication to service provider server device 220 to complete the authentication.

Figure 7:
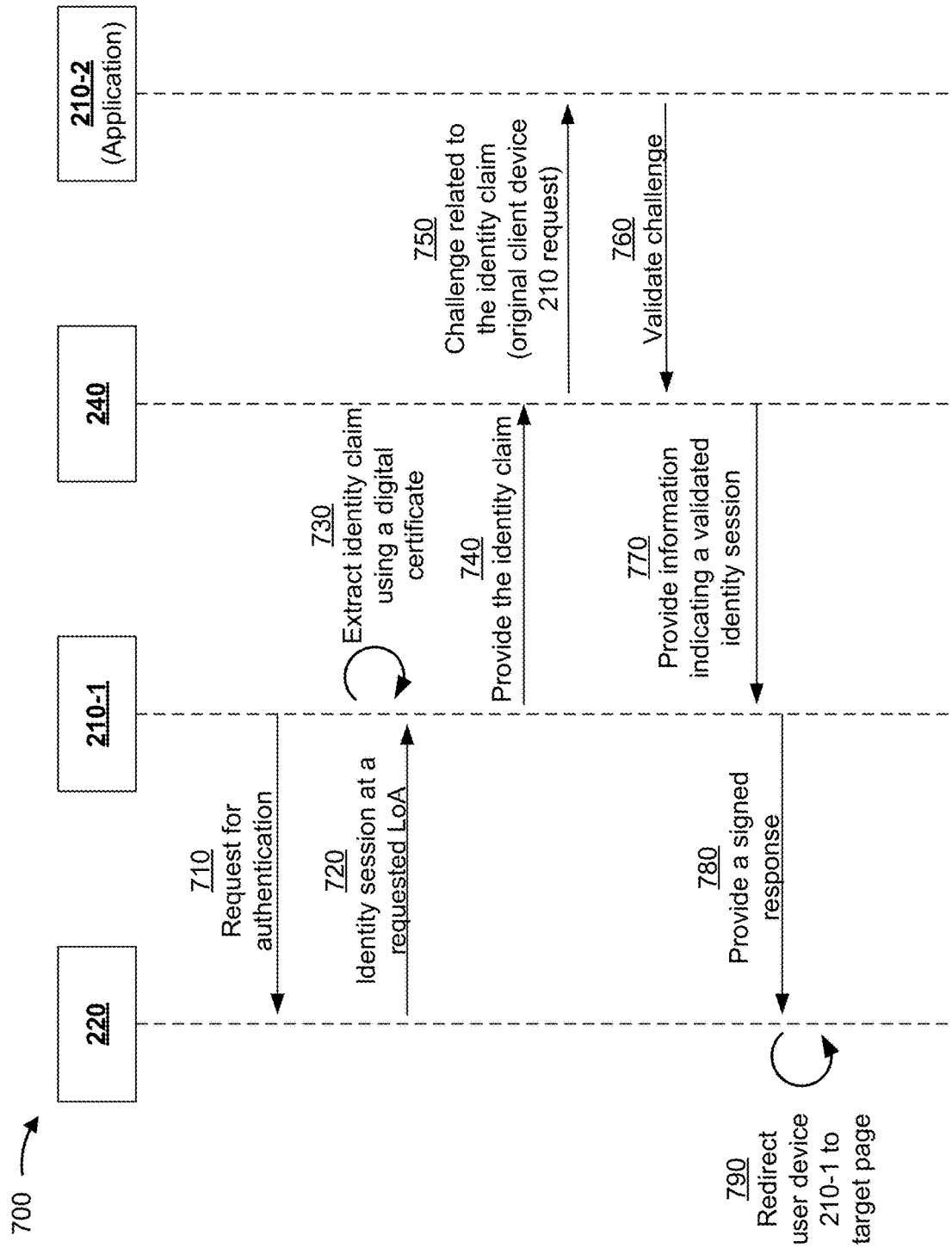

FIG. 7 shows an example of using an application on user device 210 to authenticate an identity (e.g., an application installed on user device 210, executing on user device 210, executed remotely by user device 210, etc.). For example, a user can authenticate an identity for a first user device 210 (e.g., user device 210-1, such as a laptop) using a second user device 210 (e.g., user device 210-2, such as a mobile phone).

In some implementations, and as shown by reference number 710, user device 210-1 can provide, to service provider server device 220, a request for authentication. In some implementations, and as shown by reference number 720, service provider server device 220 can provide, to user device 210-1, an identity session at a requested LoA. For example, service provider server device 220 can request particular credentials from a user of user device 210-1 based on the requested LoA. In some implementations, and as shown by reference number 730, user device 210-1 can extract, from the identity session, an identity claim using a digital certificate. For example, an identity claim can include information that identifies an identity of a user device 210-1, such as a username, a telephone number, a social security number, and/or the like associated with the user.

In some implementations, and as shown by reference number 740, user device 210 can provide the identity claim to identity management server device 240. In some implementations, and as shown by reference number 750, identity management server device 240 can provide, to an application running on user device 210-2, a challenge related to the identity claim. For example, the challenge can be related to the original request for authentication from user device 210-1. Continuing with the previous example, user device 210-2 can cause an application to open on user device 210 and/or can provide information for display requesting input of information to satisfy the challenge (e.g., information that matches the identity claim).

In some implementations, and as shown by reference number 760, the application running on user device 210-2 can provide, to identity management server device 240, information to validate the challenge. For example, the information can be stored on user device 210-2, input by a user of user device 210-2, and/or the like. In some implementations, the information can include a set of credentials. In some implementations, and as shown by reference number 770, identity management server device 240 can provide, to user device 210-1, information indicating a validated identity session (e.g., after identity management server device 240 authenticates the information received from user device 210-2). In some implementations, and as shown by reference number 780, user device 210 can provide a signed response to service provider server device 220. In some implementations, and as shown by reference number 790, service provider server device 220 can redirect user device 210-1 to a target page (e.g., a particular webpage related to providing a service to user device 210-1).

Figure 8:
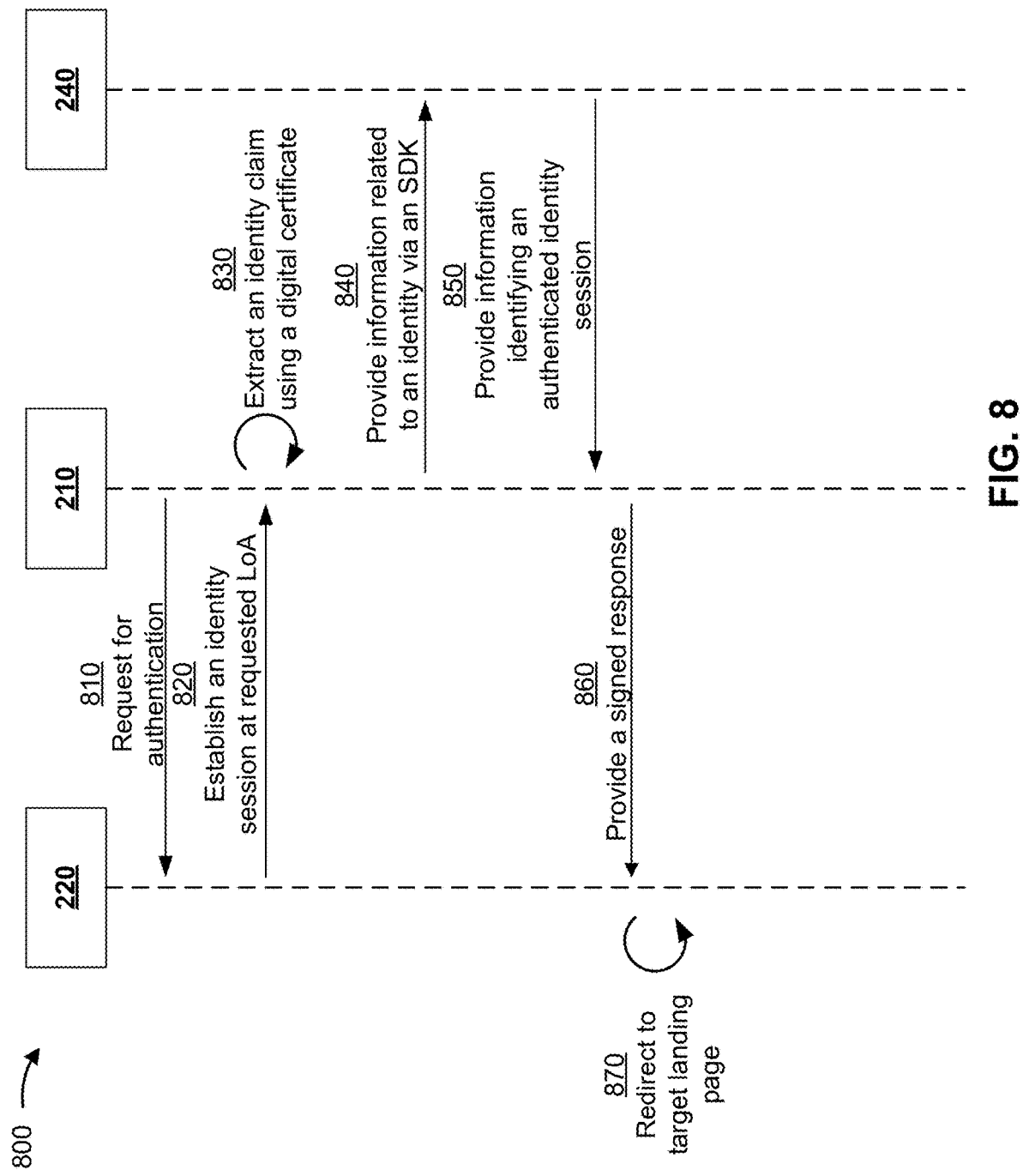

FIG. 8 shows an example of using an application on user device 210 to authenticate an identity of a user of user device 210.

In some implementations, and as shown by reference number 810, user device 210 can provide a request for authentication to service provider server device 220. In some implementations, and as shown by reference number 820, service provider server device 220 can establish, with user device 210, an identity session at a requested LoA. In some implementations, and as shown by reference number 830, user device 210 can extract, from the identity session, an identity claim using a digital certificate.

In some implementations, and as shown by reference number 840, user device 210 can provide information related to an identity to identity management server device 240 via a software development kit (SDK) associated with the application on user device 210. In some implementations, and as shown by reference number 850, identity management server device 240 can provide information identifying an authenticated identity session to user device 210 (e.g., after authenticating the identity of the user of user device 210). In some implementations, and as shown by reference number 860, user device 210 can provide a signed response to service provider server device 220 (e.g., to authenticate the identity session with service provider server device 220). In some implementations, and as shown by reference number 870, service provider server device 220 can redirect user device 210 to a target landing page (e.g., a target webpage) after authenticating the identity of the user of user device 210.

Figure 9:
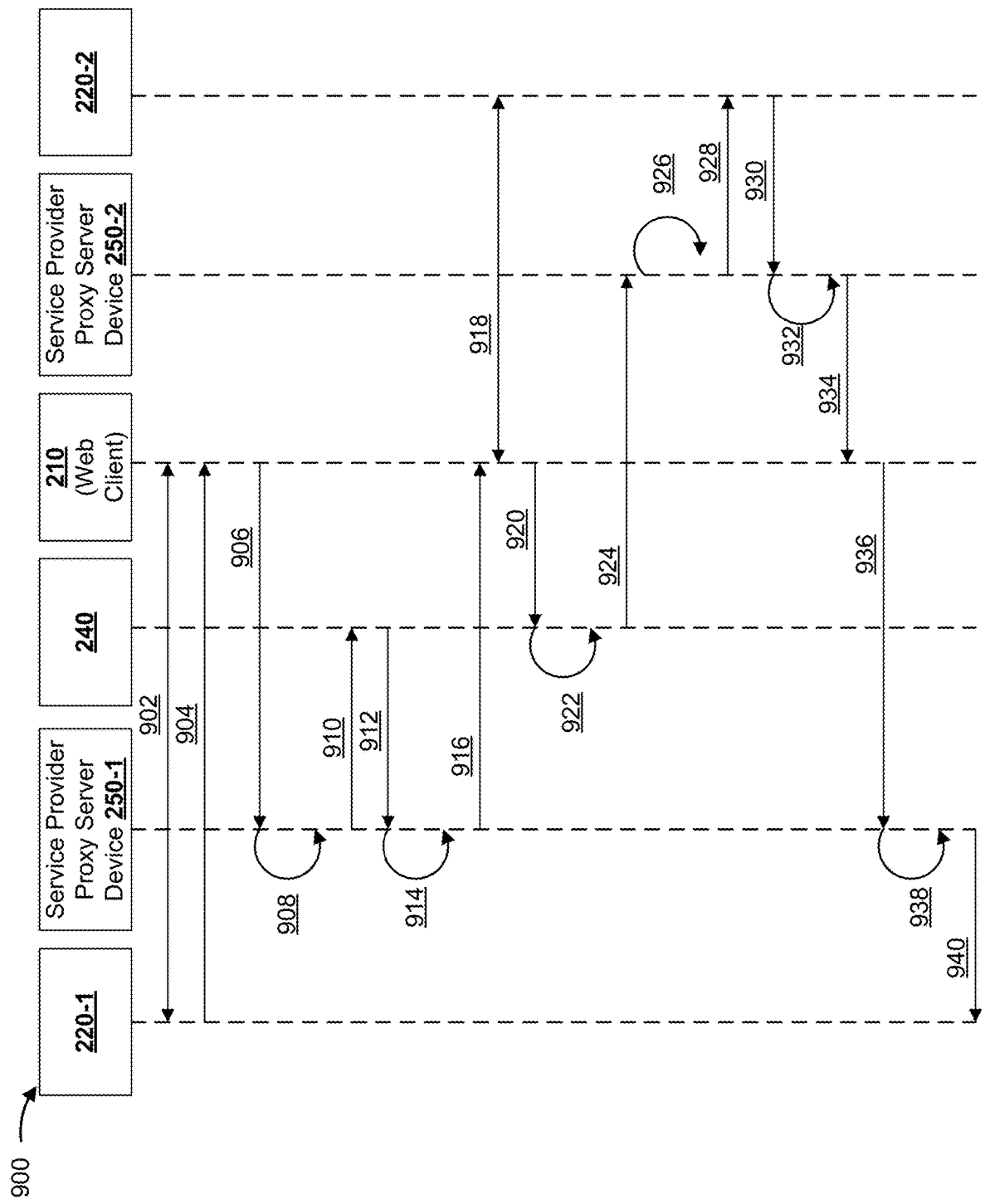

FIG. 9 shows an example of using a web client to authorize an identity. For example, FIG. 9 shows an example of authorizing a first service provider (associated with service provider server device 220-1 and service provider proxy server device 250-1) to transact with a second service provider (associated with service provider server device 220-2 and service provider proxy server device 250-2) on behalf of a user of user device 210.

In some implementations, and as shown by reference number 902, service provider server device 220-1 and a web client on user device 210 can communicate to authenticate a user of user device 210. For example, service provider server device 220-1 can request that user device 210 provide a set of credentials related to authenticating the user of user device 210 (e.g., request that the user input a username/password combination, request that user device 210 provide a stored security token, etc.). In some implementations, and as shown by reference number 904, service provider server device 220-1 can provide, to user device 210, an authorization request to request authorization of the first service provider to transact with the second service provider. In some implementations, service provider server device 220-1 can generate the request using a private identifier that identifies the user of user device 210 and/or an account associated with the user and a secret. In some implementations, and as shown by reference number 906, the web client on user device 210 can provide a session identifier (e.g., that identifies a session related to authorization of the first service provider) and an identifier that identifies the second service provider to the first service provider (e.g., to service provider proxy server device 250-1).

In some implementations, and as shown by reference number 908, service provider proxy server device 250-1 can generate a signed request for a public key related to the second service provider for the user of user device 210. In some implementations, and as shown by reference number 910, service provider proxy server device 250-1 can provide the signed request to identity management server device 240. In some implementations, and as shown by reference number 912, identity management server device 240 can provide, to service provider proxy server device 250-1, the public key related to the second service provider and a contract. For example, the public key and/or the contract can be signed by identity management server device 240. In some implementations, a contract can include information identifying that a service provider has been authorized by an owner of an identity to use the identity to communicate with another service provider.

As further shown in FIG. 9, in some implementations, and as shown by reference number 914, service provider proxy server device 250-1 can translate the authorization request from the private identifier and/or secret to a universal identifier and/or secret. Additionally, or alternatively, service provider proxy server device 250-1 and can generate the authorization request with a PKI envelope. In some implementations, and as shown by reference number 916, service provider proxy server device 250-1 can provide, to the web client on user device 210, the authorization request. For example, the authorization request can be signed service provider proxy server device 250-1 and/or encrypted using a public key associated with the second service provider. In some implementations, and as shown by reference number 918, the web client on user device 210 and service provider server device 220-2 can authenticate a user of user device 210. For example, service provider server device 220-2 can request a set of credentials from user device 210 (e.g., input of a username/password combination, a security token stored by user device 210, etc.).

In some implementations, and as shown by reference number 920, the web client on user device 210 can provide the authorization request to identity management server device 240 (e.g., after service provider server device 220-2 has authenticated the identity of the user of user device 210). In some implementations, and as shown by reference number 922, identity management server device 240 can validate the authorization request and approve the authorization request (e.g., based on information indicating that service provider server device 220-2 has authenticated the set of credentials from user device 210).

In some implementations, and as shown by reference number 924, identity management server device 240 can redirect the authorization request to service provider proxy server device 250-2. In some implementations, and as shown by reference number 926, service provider proxy server device 250-2 can decrypt and validate the authorization request (e.g., using a private key associated with the second service provider). In some implementations, and as shown by reference number 928, service provider proxy server device 250-2 can provide the decrypted (e.g., unwrapped) authorization request to service provider server device 220-2. In some implementations, and as shown by reference number 930, service provider server device 220-2 can provide an authorization code to service provider proxy server device 250-2. For example, the authorization code can permit the first service provider to communicate with the second service provider.

In some implementations, and as shown by reference number 932, service provider proxy server device 250-2 can sign the authorization code and can encrypt the authorization code. For example, service provider proxy server device 250-2 can encrypt the authorization code using a public key associated with the first service provider. In some implementations, and as shown by reference number 934, service provider proxy server device 250-2 can provide the authorization code to user device 210. For example, service provider proxy server device 250-2 can provide the authorization code to the web client on user device 210 as an authorization code binary large object (BLOB).

In some implementations, and as shown by reference number 936, the web client on user device 210 can provide the authorization code (e.g., the authorization code BLOB) to service provider proxy server device 250-1. In some implementations, and as shown by reference number 938, service provider proxy server device 250-1 can decrypt the authorization code (e.g., decrypt the authorization code BLOB). For example, service provider proxy server device 250-1 can decrypt the authorization code using a private key associated with the first service provider. In some implementations, and as shown by reference number 940, service provider proxy server device 250-1 can provide a decrypted (e.g., unwrapped) authorization code to service provider server device 220-1 (e.g., to permit service provider server device 220-1 to communicate with service provider server device 220-2 on behalf of the user of user device 210).

Figure 10:
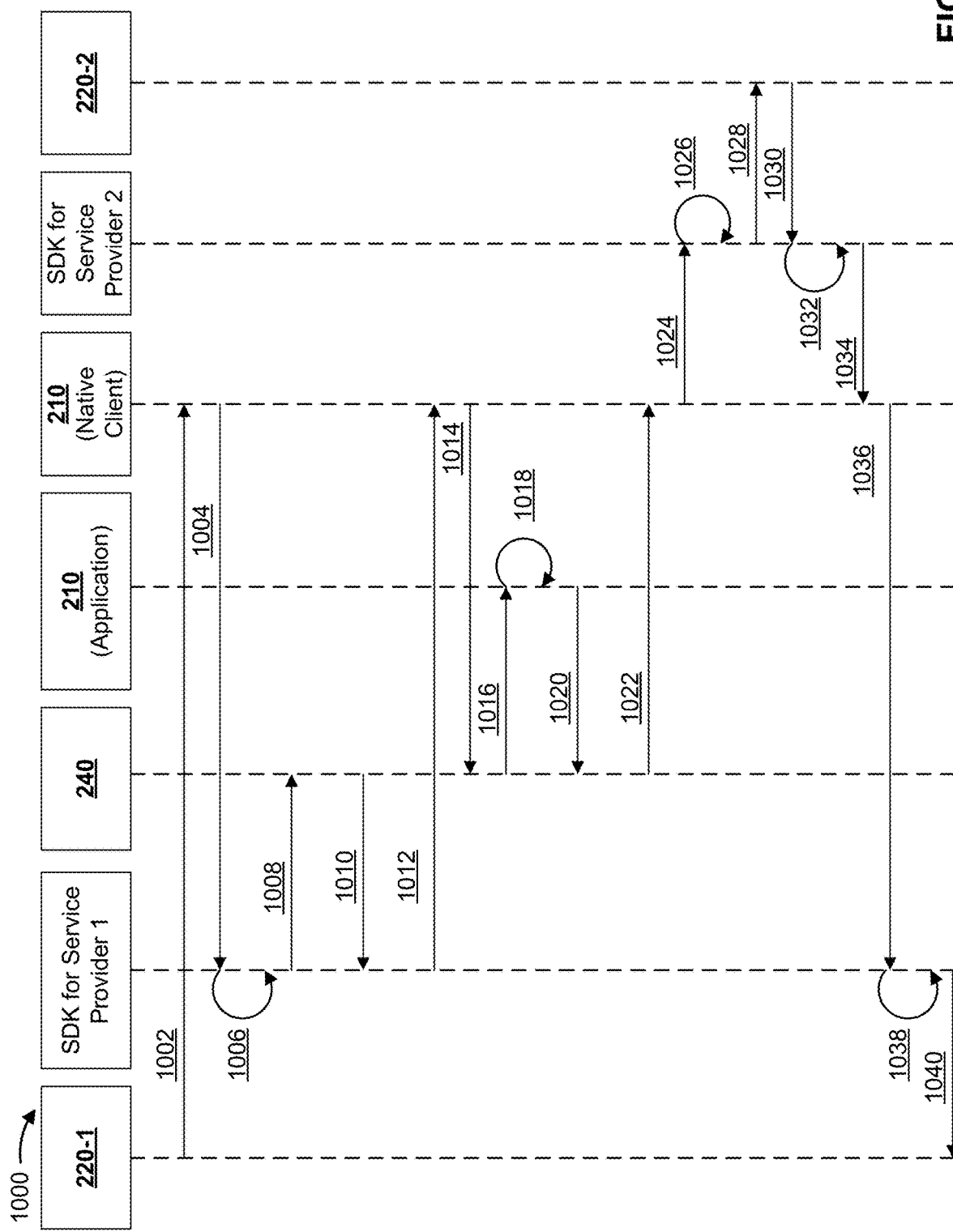

FIG. 10 shows an example of using an application on user device 210 to authorize an identity. For example, FIG. 10 shows an example of using an application to authorize a first service provider (associated with service provider server device 220-1 and an SDK for service provider 1) to use an identity to communicate with a second service provider (e.g., associated with service provider server device 220-2 and an SDK for service provider 2). In some implementations, the SDKs for service providers 1 and 2 can be included in applications associated with the first and second service providers, respectively, on user device 210.

In some implementations, and as shown by reference number 1002, service provider server device 220-1 can provide, to a native client on user device 210, an authorization request to request authorization for the first service provider to transact with the second service provider on behalf of the user of user device 210. In some implementations, and as shown by reference number 1004, the native client on user device 210 can provide, to the SDK for service provider 1, a session identifier that identifies a session related to the authorization request and an identifier that identifies the second service provider. For example, the SDK for service provider 1 can be included in an application associated with the first service provider that is executed on user device 210 (e.g., to permit a user of user device 210 to authenticate an identity of the user via the application). In some implementations, and as shown by reference number 1006, the SDK for service provider 1 can generate a signed authorization request for a user of user device 210 (e.g., that is to be signed using a public key associated with the second service provider).

In some implementations, and as shown by reference number 1008, the SDK for service provider 1 can provide the signed authorization request to identity management server device 240. In some implementations, and as shown by reference number 1010, identity management server device 240 can provide, to the SDK for service provider 1, a public key associated with the second service provider and a contract. For example, the public key and/or the contract can be signed by identity management server device 240.

In some implementations, and as shown by reference number 1012, the SDK for service provider 1 can provide, to the native client on user device 210, the authorization request. For example, the authorization request can be signed by the first service provider (e.g., by the SDK for service provider 1) and/or encrypted using a public key associated with the second service provider. In some implementations, and as shown by reference number 1014, the native client on user device 210 can provide an unsigned authorization request to identity management server device 240. In some implementations, and as shown by reference number 1016, identity management server device 240 can provide, to an application running on user device 210 (e.g., the same user device 210 on which the native client is running), a signed authorization request.

In some implementations, and as shown by reference number 1018, the application on user device 210 can approve the authorization request (e.g., the authorization request signed by identity management server device 240). In some implementations, and as shown by reference number 1020, the application on user device 210 can provide a user-signed authorization request to identity management server device 240 (e.g., indicating that the user of user device 210 approved the authorization request).

In some implementations, and as shown by reference number 1022, identity management server device 240 can provide, to the native client on user device 210, the authorization request. In some implementations, and as shown by reference number 1024, the native client on user device 210 can provide the authorization request to the SDK for service provider 2. In some implementations, and as shown by reference number 1026, the SDK for service provider 2 can decrypt the authorization request. For example, the SDK for service provider 2 can decrypt the authorization request using a private key associated with the second service provider. In some implementations, and as shown by reference number 1028, the SDK for service provider 2 can provide a decrypted (e.g., unwrapped) authorization request to service provider server device 220-2.

In some implementations, and as shown by reference number 1030, service provider server device 220-2 can provide an authorization code to the SDK for service provider 2. In some implementations, and as shown by reference number 1032, the SDK for service provider 2 can sign the authorization code and/or can encrypt the authorization code (e.g., using a public key associated with the first service provider). In some implementations, and as shown by reference number 1034, the SDK for service provider 2 can provide the authorization code (e.g., as an authorization code BLOB) to the native client on user device 210.

In some implementations, and as shown by reference number 1036, the native client on user device 210 can provide the authorization code to the SDK for service provider 1. In some implementations, and as shown by reference number 1038, the SDK for service provider 1 can decrypt the authorization code (e.g., using a private key associated with the first service provider). In some implementations, and as shown by reference number 1040, the SDK for service provider 1 can provide a decrypted (e.g., unwrapped) authorization code to service provider server device 220-1.

Figure 11:
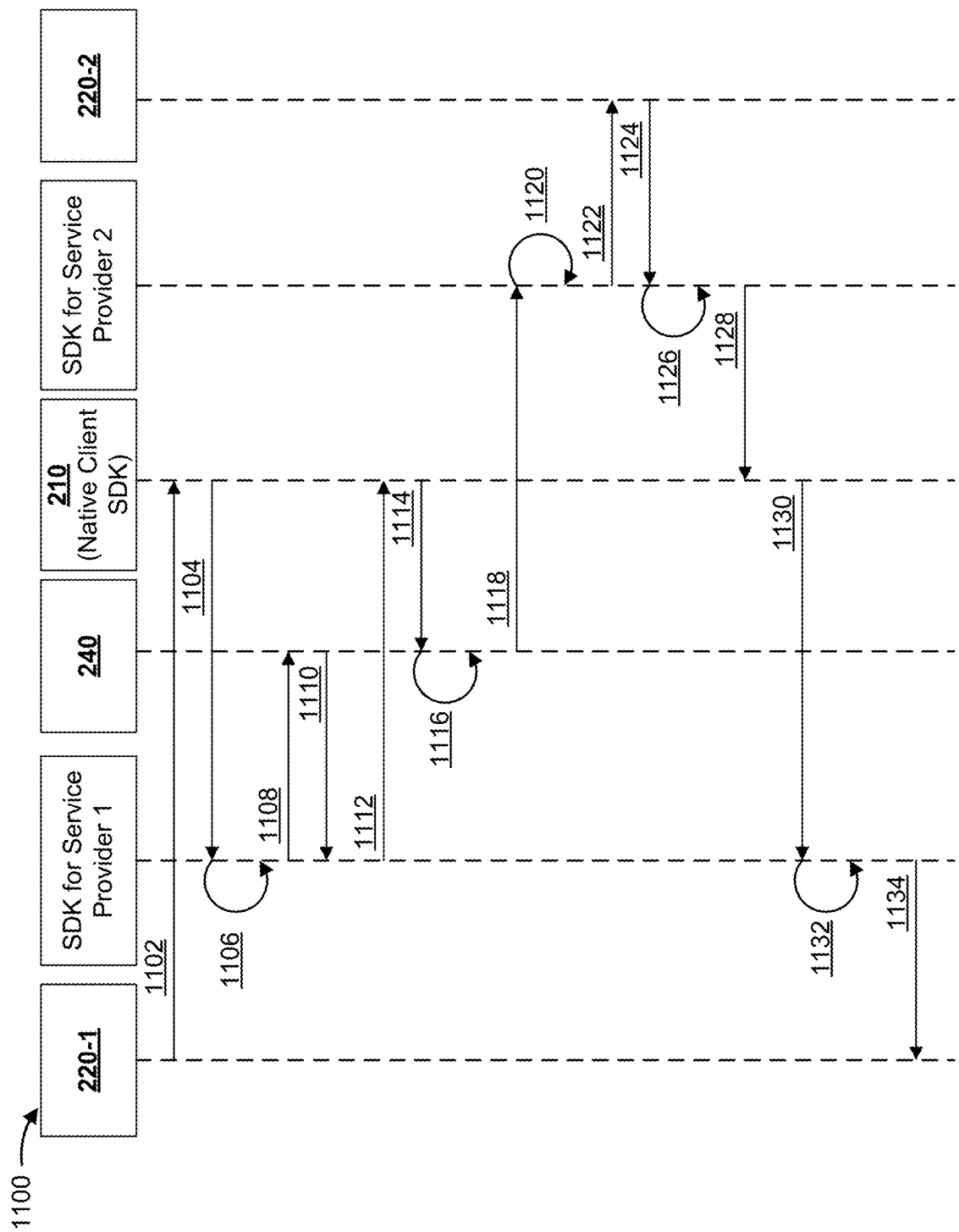

FIG. 11 shows an example of using an application on user device 210 that is includes a native client SDK to authorize use of an identity. For example, a first service provider (associated with service provider server device 220-1 and an SDK for service provider 1) can need authorization to transact with a second service provider (associated with service provider server device 220-2 and an SDK for service provider 2) on behalf of a user of user device 210.

In some implementations, and as shown by reference number 1102, service provider server device 220-1 can provide, to the native client SDK on user device 210, an authorization request to request authorization for the first service provider to transact with the second service provider on behalf of the user of user device 210. In some implementations, and as shown by reference number 1104, the native client SDK on user device 210 can provide, to the SDK for service provider 1, a session identifier (e.g., related to a session related to the authorization request) and an identifier that identifies the second service provider. In some implementations, and as shown by reference number 1106, the SDK for service provider 1 can generate a signed request for a public key associated with the second service provider for the user of user device 210. In some implementations, and as shown by reference number 1108, the SDK for service provider 1 can provide the signed request to identity management server device 240. In some implementations, and as shown by reference number 1110, identity management server device 240 can provide, to the SDK for service provider 1, a public key for the second service provider and a contract. For example, the public key and/or the contract can be signed by identity management server device 240.

In some implementations, and as shown by reference number 1112, the SDK for service provider 1 can provide, to the native client SDK on user device 210, the authorization request. For example, the authorization request can be signed by the first service provider and/or can be encrypted using a public key associated with the second service provider. In some implementations, and as shown by reference number 1114, the native client SDK on user device 210 can provide the authorization request to identity management server device 240. In some implementations, and as shown by reference number 1116, identity management server device 240 can approve the authorization request. For example, identity management server device 240 can approve the authentication request based on a digital certificate associated with the authorization request.

In some implementations, and as shown by reference number 1118, identity management server device 240 can provide the authorization request to the SDK for service provider 2. In some implementations, and as shown by reference number 1120, the SDK for service provider 2 can decrypt and the authorization request. For example, the SDK for service provider 2 can decrypt the authorization request using a private key associated with the second service provider. In some implementations, and as shown by reference number 1122, the SDK for service provider 2 can provide a decrypted (e.g., unwrapped) authorization request to service provider server device 220-2. In some implementations, and as shown by reference number 1124, service provider server device 220-2 can provide an authorization code to the SDK for service provider 2 (e.g., to be used to communicate with service provider server device 220-2).

In some implementations, and as shown by reference number 1126, the SDK for service provider 2 can sign and/or encrypt the authorization code (e.g., a public key associated with the first service provider). In some implementations, and as shown by reference number 1128, the SDK for service provider 2 can provide the authorization code (e.g., as an authorization code BLOB) to the native client SDK on user device 210. In some implementations, and as shown by reference number 1130, the native client SDK on user device 210 can provide the authorization code to the SDK for service provider 1. In some implementations, and as shown by reference number 1132, the SDK for service provider 1 can decrypt the authorization code. For example, the SDK for service provider 1 can decrypt the authorization code using a private key associated with the first service provider. In some implementations, and as shown by reference number 1134, the SDK for service provider 1 can send a decrypted (e.g., unwrapped) authorization code BLOB to service provider server device 220-1.

Figure 12:
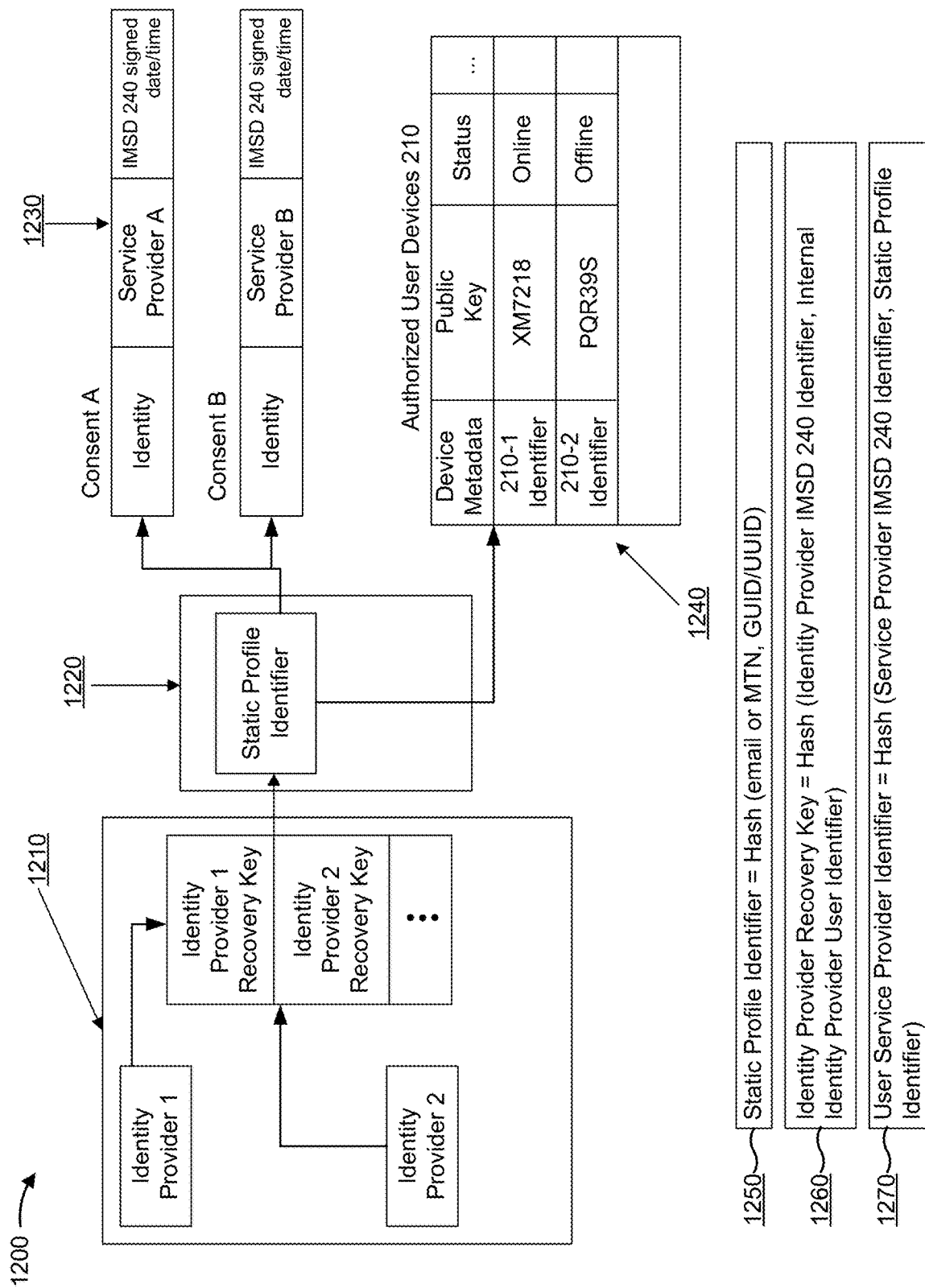

FIG. 12 shows an example of various keys and/or identifiers used by user device 210, service provider server device 220, identity provider server device 230, identity management server device 240, and/or server device 250.

As shown in FIG. 12, and by reference number 1210, each identity provider can be associated with an identity provider recovery key. For example, a user of user device 210 can use an identity provider recovery key to recover, from a corresponding identity provider, an identity and/or an account associated with the user via identity provider server device 230 (e.g., by providing the identity provider recovery key to identity provider server device 230). In some implementations, a user can have a different identity provider recovery key for each identity provider with which the user has an account. For example, each identity provider server device 230 can store a different identity provider recovery key for a user of user device 210.

As shown by reference number 1220, a set of identity provider recovery keys associated with an identity can correspond to a static profile identifier. For example, identity management server device 240 can store a single static profile identifier for each identity which identity management server device 240 has established. Continuing with the previous example, a set of identity provider recovery keys associated with an individual can be mapped to a static profile identifier associated with the identity. Continuing with the previous example, identity management server device 240 can store information identifying the mapping between a static profile identifier and a set of identity provider recovery keys.

In some implementations, a static profile identifier can be used to recover an account associated with an identity provider. For example, if a user provides a static profile identifier to identity management server device 240, identity management server device 240 can provide a corresponding identity provider recovery key to user device 210 to permit user device 210 to provide the identity provider recovery key to a particular identity provider server device 230 and/or can provide the corresponding identity provider recovery key to the particular identity provider server device 230 on behalf of the user. Additionally, or alternatively, a static profile identifier can be used to recover an identity associated with identity management server device 240. For example, user device 210 can provide a static profile identifier to identity management server device 240 to recover an identity associated with identity management server device 240.

As shown by reference number 1230, a static profile identifier can be associated with various consents. For example, a consent can relate to a permission of a service provider to transact on behalf of an identity (e.g., on behalf of a user of user device 210). In some implementations, information related to a consent can identify an identity with which the consent is associated, a service provider with which the consent is associated, whether identity management server device 240 (IMSD 240) has signed the consent, a date and/or time identity management server device 240 signed the consent, and/or the like.

As shown by reference number 1240, a static profile identifier can be associated with various authorized devices. For example, an authorized device can be authorized to participate in particular communications related to an identity of an individual. For example, an individual can have a mobile phone, a laptop computer, a desktop computer, and/or the like, any of which can be an authorized device which the individual can use to communicate with another device regarding the individual's identity (e.g., to access a service, to update information related to an identity, etc.). In some implementations, an authorized device can store a digital certificate, similar to that described elsewhere herein, which can be used by the authorized device to prove to another device to indicate that the authorized device is an authorized device.

As shown by reference number 1250, a static profile identifier can be based on one or more other identifiers. For example, a static profile identifier can be a hash of a first identifier and a second identifier associated with an individual. Continuing with the previous example, the first identifier can be an email address, a mobile telephone number (MTN), and/or the like associated with the individual and the second identifier can be a global unique identifier (GUID), a universally unique identifier (UUID), and/or the like (e.g., a social security number, a driver's license number, a passport number, etc. associated with the individual). In this way, a static profile identifier can uniquely identify an individual in a secure manner. In addition, by hashing information related to an individual, identity management server device 240 can store a secure version of the information.

In some implementations, a static profile identifier can be used to recover a profile of an individual associated with a service provider (e.g., stored on service provider server device 220). For example, a user can provide information identifying the static profile identifier to identity management server device 240. Additionally, or alternatively, a user can provide information identifying a first identifier and/or a second identifier used to generate the static profile identifier. Identity management server device 240 can use the static profile identifier (or determine the static profile identifier for the individual) to identify user service provider identifiers (described below) associated with the individual, and thus identify profiles of an individual associated with various service providers (e.g., so that the individual can recover the profiles). In this way, identity management server device 240 can facilitate recovery of profiles stored by service provider server device 220, without storing credentials or other information for the profiles.

As shown by reference number 1260, an identity provider recovery key can be based on one or more other identifiers. For example, an identity provider recovery key can be a hash of a first identifier and a second identifier. Continuing with the previous example, the first identifier can be an identifier that identity management server device 240 uses to uniquely identify an individual with which the identity provider recovery key is associated (e.g., shown as "identity provider IMSD 240 identifier"). Additionally, or alternatively, and continuing with the previous example, the second identifier can be an identifier associated with an individual that identifies the individual to an identity provider server device 230 (e.g., shown as an "internal identity provider user identifier").

In some implementations, an identity provider recovery key can reduce or eliminate a need for identity management server device 240 to store information that identifies an individual in the same manner as identity provider server device 230. This increases a security of the individual's identity. In addition, an identity provider recovery key can facilitate recovery of a profile associated with an individual via identity provider server device 230 (e.g., when the individual provides an identity provider recovery key to identity provider server device 230 and/or identity management server device 240, which identity management server device 240 can use to identify information that identifies the individual to identity provider server device 230).

As shown by reference number 1270, identity management server device 240 can store a user service provider identifier that identifies a combination of a user and a service provider (e.g., a service provider with which a user has an account, a service provider permitted to transact on behalf of the user, etc.). In some implementations, the user service provider identifier can be based on one or more identifiers. For example, the user service provider identifier can be a hash of a first identifier and a second identifier. Continuing with the previous example, the first identifier can be an identifier that identity management server device 240 uses to identify a service provider (e.g., shown as "service provider IMSD 240 identifier"). Additionally, or alternatively, and continuing with the previous example, the second identifier can be the static profile identifier. In this way, the user service provider identifier can uniquely identify a service provider/user combination.

As indicated above, FIGS. 5-12 are provided merely as examples. Other examples are possible and can differ from what was described with regard to FIGS. 5-12.

In this way, identity management server device 240 can perform one or more actions related to managing an identity for an individual. This permits the individual's identity to be managed according to a threshold level of assurance, thereby increasing a security of the individual's identity via consistent management according to the threshold level of assurance. In addition, this reduces or eliminates a need for an individual to synchronize accounts for multiple entities, thereby conserving time of the individual and/or computing resources of a device associated with the individual that would otherwise be consumed synchronizing accounts across multiple entities.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
establish an identity for an individual by communicating with a first set of devices,
the first set of devices including one or more of:
a user device associated with the individual,
a first server device associated with a certificate authority, or
a second server device associated with an identity provider;
wherein the one or more processors, when establishing the identity for the individual, are to:
receive a signed and authenticated identity endorsement from the user device,
the signed and authenticated identity endorsement identifying that the individual has provided a set of credentials to the second server device to authenticate the identity of the individual to the second server device, and
provide a digital certificate to the user device after receiving the signed and authenticated identity endorsement,
the digital certificate to be used by the user device to permit the device to authenticate the identity of the individual when the user device communicates with the device;
authenticate the identity of the individual by communicating with a second set of devices,
the second set of devices including one or more of:
the user device, or
a third server device associated with a first service provider; and
authorize the identity of the individual to be used by one or more service providers by communicating with a third set of devices,
the third set of devices including one or more of:
the user device,
the third server device, or
a fourth server device associated with a second service provider.

2. The device of claim 1, where the one or more processors are further to:
receive information related to recovering a profile related to the individual; and
perform an action to facilitate recovery of the profile based on the information related to recovering the profile.

3. The device of claim 1, where the one or more processors are further to:
communicate with the first server device to receive the digital certificate prior to providing the digital certificate to the user device;
receive the digital certificate from the first server device after communicating with the first server device; and
where the one or more processors, when providing the digital certificate, are to:
provide the digital certificate to the user device after receiving the digital certificate from the first server device.

4. The device of claim 1, where the one or more processors, when authenticating the identity of the individual, are to:
receive a signed authentication challenge from the user device,
the signed authentication challenge being associated with the third server device; and
validate the identity of the individual after receiving the signed authentication challenge from the user device.

5. The device of claim 4, where the one or more processors are further to:
provide, to the user device, information indicating that the identity of the individual was validated,
the information being associated with satisfying an authentication challenge associated with the third server device.

6. The device of claim 1, where the one or more processors, when authenticating the identity of the individual, are to:
receive, from the user device, an authorization request to authorize the third server device to communicate with the fourth server device on behalf of the individual;
sign the authorization request to form a signed authorization request after receiving the authorization request; and
provide, to the user device, the signed authorization request after signing the authorization request.

7. The device of claim 1, where the one or more processors are further to:
generate an identity session based on the user device providing a request for establishment of the identity for the individual.

8. A non-transitory computer-readable medium storing instructions, the instructions comprising:
one or more instructions that, when executed by one or more processors, cause the one or more processors to:
establish an identity for an individual by communicating with a first set of devices,
the first set of devices including one or more of:
a user device associated with the individual,
a first server device associated with a certificate authority, or
a second server device associated with an identity provider;
authenticate the identity of the individual by communicating with a second set of devices,
the second set of devices including one or more of:
the user device, or
a third server device associated with a first service provider;
authorize the identity of the individual to be used by one or more service providers by communicating with a third set of devices,
the third set of devices including one or more of:
the user device,
the third server device, or
a fourth server device associated with a second service provider;
provide, to a web client associated with the user device, information for display to prompt the individual to grant permission for a requested authorization in association with authorizing the identity of the individual;
receive other information indicating that the individual has granted permission for the requested authorization after providing the information for display; and
provide, to the user device, a wrapped response to confirm authentication of the identity of the individual after receiving the other information.

9. The non-transitory computer-readable medium of claim 8, where the one or more instructions, that cause the one or more processors to authorize the identity of the individual, cause the one or more processors to:
sign an authorization request after receiving the authorization request from the user device,
the authorization request being associated with permitting the third server device to communicate with the fourth server device on behalf of the individual; and
provide the authorization request to the user device after signing the authorization request,
the authorization request to be provided to the fourth server device.

10. The non-transitory computer-readable medium of claim 8, where the one or more instructions, when executed by the one or more processors, further cause the one or more processors to:
receive a request to establish the identity for the individual prior to establishing the identity for the individual,
the request being received from a native client associated with the user device; and
provide, to the user device, a digital certificate in association with establishing the identity for the individual after receiving the request,
the digital certificate being associated with authenticating the identity of the individual.

11. The non-transitory computer-readable medium of claim 8, where the one or more instructions, when executed by the one or more processors, further cause the one or more processors to:
receive, from the third server device and via the user device, a signed authentication challenge after establishing the identity for the individual,
the signed authentication challenge being associated with authenticating the identity of the individual to the third server device; and
provide, the user device, information indicating that the identity of the individual has been authenticated after receiving the signed authentication challenge,
the information to be provided to the third server device.

12. The non-transitory computer-readable medium of claim 8, where the one or more instructions, when executed by the one or more processors, further cause the one or more processors to:
receive, from a native client on the user device, an unsigned authorization request to authorize the first service provider to transact with the second service provider on behalf of the individual in association with authorizing the identity of the individual; and
provide, to an application associated with the user device, the unsigned authorization request to permit the user device to sign the unsigned authorization request after receiving the unsigned authorization request.

13. The non-transitory computer-readable medium of claim 12, where the one or more instructions, when executed by the one or more processors, further cause the one or more processors to:
receive, from the application on the user device, a signed authorization request after providing the unsigned authorization request to the application on the user device; and
provide, to the native client on the user device, the signed authorization request after receiving the signed authorization request from the application on the user device.

14. The non-transitory computer-readable medium of claim 8, where the one or more instructions, that cause the one or more processors to establish the identity, cause the one or more processors to:
receive a signed and authenticated identity endorsement from the user device,
the signed and authenticated identity endorsement identifying that the individual has provided a set of credentials to the second server device to authenticate the identity of the individual to the second server device; and
provide a digital certificate to the user device after receiving the signed and authenticated identity endorsement,
the digital certificate to be used by the user device to permit the device to authenticate the identity of the individual when the user device communicates with a device.

15. A method, comprising:
establishing, by a device, an identity for an individual by communicating with a first set of devices,
the first set of devices including one or more of:
a user device associated with the individual,
a first server device associated with a certificate authority, or
a second server device associated with an identity provider;
where establishing the identity for the individual comprises:

receiving a signed and authenticated identity endorsement from the user device,
the signed and authenticated identity endorsement identifying that the individual has provided a set of credentials to the second server device to authenticate the identity of the individual to the second server device, and
providing a digital certificate to the user device after receiving the signed and authenticated identity endorsement,
the digital certificate to be used by the user device to permit the device to authenticate the identity of the individual when the user device communicates with the device;
authenticating, by the device, the identity of the individual by communicating with a second set of devices,
the second set of devices including one or more of:
the user device, or
a third server device associated with a first service provider; and
authorizing, by the device, the identity of the individual to be used by one or more service providers by communicating with a third set of devices,
the third set of devices including one or more of:
the user device,
the third server device, or
a fourth server device associated with a second service provider.

16. The method of claim 15, where establishing the identity for the individual comprises:
establishing the identity for the individual according to a level of assurance.

17. The method of claim 15, further comprising:
receiving the digital certificate from the first server device in association with establishing the identity for the individual; and
providing the digital certificate to the user device after receiving the digital certificate,
the digital certificate to be used to indicate that the user device is an authorized device.

18. The method of claim 15, further comprising:
receiving a signed authentication challenge from the user device in association with authenticating the identity of the individual; and
providing, to the user device, information indicating that the identity of the individual has been authenticated after receiving the signed authentication challenge from the user device.

19. The method of claim 18, further comprising:
authenticating the identity of the individual after receiving the signed authentication challenge from the user device; and
where providing the information to the user device comprises:
providing the information to the user device after authenticating the identity of the individual.

20. The method of claim 15, further comprising:
receiving, from the user device, an authorization request in association with authorizing the identity for the individual,
the authorization request to permit the first service provider to transact with the second service provider on behalf of the individual;
signing the authorization request to form a signed authorization request after receiving the authorization request from the user device; and
providing, to the user device, the signed authorization request after signing the authorization request.

* * * * *